United States Patent
Xian et al.

(10) Patent No.: US 11,450,083 B2
(45) Date of Patent: Sep. 20, 2022

(54) DUAL-PATTERN OPTICAL 3D DIMENSIONING

(71) Applicant: Honeywell International Inc., Morris Plains, NJ (US)

(72) Inventors: Tao Xian, Mount Laurel, NJ (US); Chen Feng, Snohomish, WA (US); Paul Poloniewicz, Waxhaw, NC (US); Scott Bracken, Lynnwood, WA (US)

(73) Assignee: Honeywell International Inc., Morris Plains, NJ (US)

( * ) Notice: Subject to any disclaimer, the term of this patent is extended or adjusted under 35 U.S.C. 154(b) by 230 days.

(21) Appl. No.: 16/585,832

(22) Filed: Sep. 27, 2019

(65) Prior Publication Data

US 2021/0097320 A1 Apr. 1, 2021

(51) Int. Cl.
*G06V 10/24* (2022.01)
*G06T 7/521* (2017.01)
(Continued)

(52) U.S. Cl.
CPC ........ *G06V 10/245* (2022.01); *G01B 11/2513* (2013.01); *G06T 7/246* (2017.01);
(Continued)

(58) Field of Classification Search
USPC ............................ 382/154, 103, 312; 348/136
See application file for complete search history.

(56) References Cited

U.S. PATENT DOCUMENTS 7,079,666 B2 * 7/2006 Coulombe ......... G01B 11/2527
348/136
8,280,152 B2 * 10/2012 Thiel .................... A61B 5/1077
382/206
(Continued)

FOREIGN PATENT DOCUMENTS

CN 104050656 A 9/2014
WO 2013/173985 A1 11/2013
(Continued)

OTHER PUBLICATIONS

Advisory Action (PTOL-303) dated Sep. 25, 2019 for U.S. Appl. No. 15/657,467.
(Continued)

*Primary Examiner* — Kathleen Y Dulaney
(74) *Attorney, Agent, or Firm* — Alston & Bird LLP

(57) ABSTRACT

An optical dimensioning system includes one or more light emitting assemblies configured to project one or more predetermined patterns on an object; an imaging assembly configured to sense light scattered and/or reflected off the object, and to capture an image of the object while the patterns are projected; and a processing assembly configured to analyze the image of the object to determine one or more dimension parameters of the object. The light emitting assembly may include a single piece optical component configured for producing a first pattern and second pattern. The patterns may be distinguishable based on directional filtering, feature detection, feature shift detection, or the like. A method for optical dimensioning includes illuminating an
(Continued)

object with at least two detectable patterns; and calculating dimensions of the object by analyzing pattern separate of the elements comprising the projected patterns. One or more pattern generators may produce the patterns.

20 Claims, 21 Drawing Sheets

(51) Int. Cl.
*G06T 7/246* (2017.01)
*G01B 11/25* (2006.01)
*G06V 10/145* (2022.01)
*G06V 10/147* (2022.01)

(52) U.S. Cl.
CPC ............ *G06T 7/521* (2017.01); *G06V 10/145* (2022.01); *G06V 10/147* (2022.01); *G06V 2201/12* (2022.01)

(56) References Cited

U.S. PATENT DOCUMENTS

| | | | | |
|---|---|---|---|---|
| 8,774,495 | B2* | 7/2014 | Murashita | H04N 5/265 |
| | | | | 382/284 |
| 10,612,912 | B1* | 4/2020 | Sullivan | G06T 7/70 |
| 2001/0024326 | A1* | 9/2001 | Nakamura | H04N 9/3185 |
| | | | | 348/E9.027 |
| 2003/0039388 | A1* | 2/2003 | Ulrich | G01B 11/2518 |
| | | | | 382/145 |
| 2005/0110868 | A1* | 5/2005 | Myers | G01B 11/2509 |
| | | | | 348/E13.016 |
| 2005/0128452 | A1* | 6/2005 | Matsumoto | G03B 27/52 |
| | | | | 355/55 |
| 2008/0156619 | A1* | 7/2008 | Patel | G01B 11/0691 |
| | | | | 356/625 |
| 2012/0281240 | A1* | 11/2012 | Cohen | H04N 13/254 |
| | | | | 356/610 |
| 2014/0028805 | A1* | 1/2014 | Tohme | G01B 11/2518 |
| | | | | 348/47 |
| 2016/0050401 | A1* | 2/2016 | Gordon | G02B 27/0037 |
| | | | | 348/744 |
| 2017/0016588 | A1* | 1/2017 | Saito | F21S 41/16 |
| 2017/0310948 | A1* | 10/2017 | Pei | G01S 7/484 |
| 2018/0010903 | A1* | 1/2018 | Takao | G01S 17/89 |
| 2018/0124382 | A1* | 5/2018 | Smith | H04N 13/282 |
| 2018/0135975 | A1* | 5/2018 | Ohyama | G01B 11/2527 |
| 2018/0253863 | A1* | 9/2018 | Wallack | G06T 7/521 |
| 2018/0299262 | A1* | 10/2018 | Thiel | G01B 11/2513 |
| 2019/0026912 | A1* | 1/2019 | Feng | G01B 11/2513 |
| 2020/0240770 | A1* | 7/2020 | Engel | G06T 7/80 |
| 2021/0183085 | A1* | 6/2021 | Pau | G01B 11/25 |

FOREIGN PATENT DOCUMENTS

| | | |
|---|---|---|
| WO | 2014/011182 A1 | 1/2014 |
| WO | 2014/019130 A1 | 2/2014 |
| WO | 2014/110495 A1 | 7/2014 |

OTHER PUBLICATIONS

Decision to Grant from European Patent Office for Application No. 18184864.9, dated Oct. 31, 2019.
Examiner initiated interview summary (PTOL-413B) dated Sep. 25, 2019 for U.S. Appl. No. 15/657,467.
Final Rejection dated Jul. 9, 2019 for U.S. Appl. No. 15/657,467.
Non-Final Rejection dated Jan. 2, 2019 for U.S. Appl. No. 15/657,467.
Notice of Allowance and Fees Due (PTOL-85) dated Apr. 3, 2020 for U.S. Appl. No. 15/657,467.
Extended European Search Report issued in European Application No. 20198556.1 dated Feb. 3, 2021, 10 pages.
Requirement for Restriction/Election received for U.S. Appl. No. 16/585,847, dated Feb. 25, 2022, 10 pages.

* cited by examiner

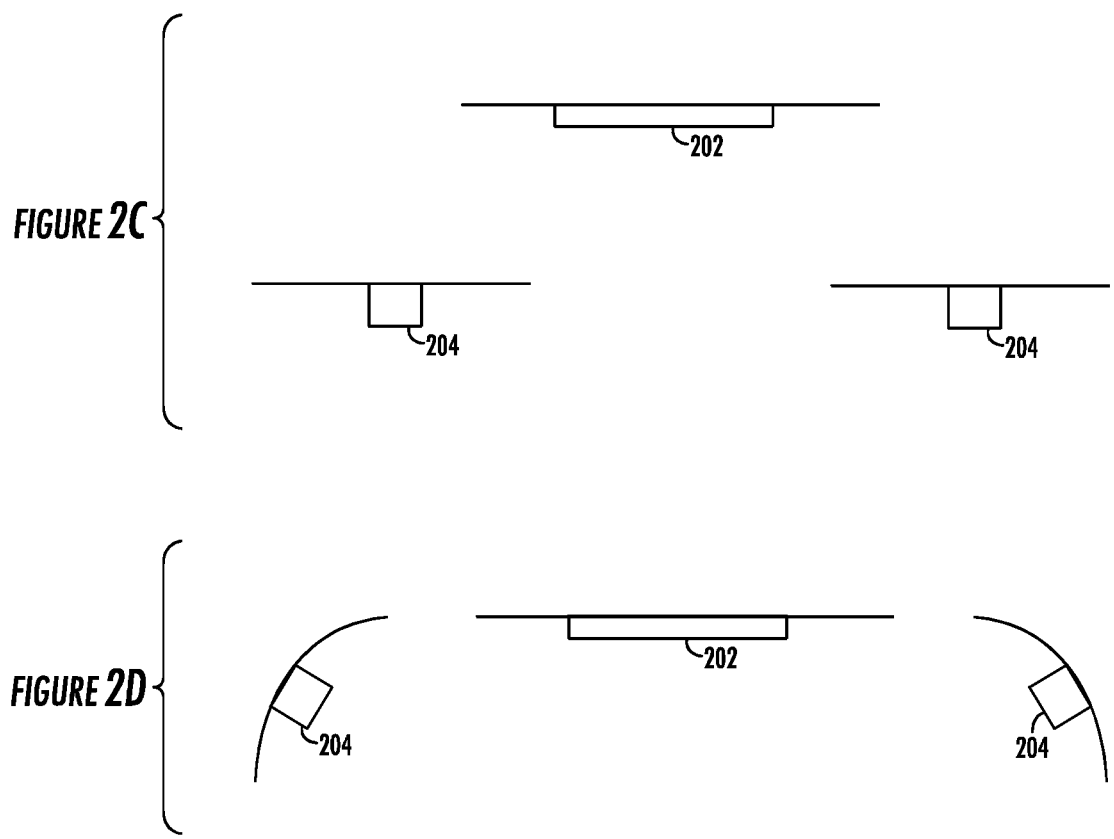

| NUM. OF STATE | STATE | PARAMETERS | MARGIN | PARAMETERS | MARGIN |
|---|---|---|---|---|---|
| BINARY | VERTICAL ELONGATED / HORIZONTAL ELONGATED | EDGE = 1 um; r = 1 um; el = 6 um; | 15.50% | EDGE = 0.75 um; r = 1 um; el = 6.5 um; | 19.20% |
| 3-STATE | CIRCLE WITH LEFT SHIFT, NO SHIFT AND RIGHT SHIFT (L, N, R) | EDGE = 1 um; r = 1.5 um; SHIFT_PER = 2.5 um; | 29.60% | EDGE = 0.75 um; r = 1.5 um; SHIFT_PER = 2.75 um; | 32.70% |

*FIGURE 11A*

| NUM. OF STATE | STATE | PARAMETERS | MARGIN @ FOCUS | 500 mm | 1000 mm | 2500 mm | 4500 mm |
|---|---|---|---|---|---|---|---|
| BINARY | VERTICAL ELONGATED / HORIZONTAL ELONGATED | EDGE = 0.75 um; r = 1 um; el = 6.5 um; | 19.20% | 17.94% | 19.23% | 20.03% | 20.27% |
| 3-STATE | CIRCLE WITH LEFT SHIFT, NO SHIFT AND RIGHT SHIFT (L, N, R) | EDGE = 0.75 um; r = 1.5 um; SHIFT_PER = 2.75 um; | 32.70% | 32.00% | 32.66% | 33.26% | 33.47% |

*FIGURE 11B*

DUAL-PATTERN OPTICAL 3D DIMENSIONING

FIELD OF THE INVENTION

The present disclosure relates generally to optical dimensioning, and more particularly to dual-pattern optical 3D dimensioning.

BACKGROUND

In some examples, optical 3D dimensioning with structural light triangulation imaging (parallax) suffers accuracy loss introduced by variations in relative positions and orientations of a projector, a camera, and a projector-camera pair. These variations can result from the thermal, structural, or other changes, such as component aging. The dimensioning accuracy problem can be, in some examples partially solved with calibration, but the ultimate accuracy is still limited due to the non-calibratable part of the variations, such as shock and vibration. In addition, temperature change of the system due to the ambient temperature change or self-generated heat may affect the triangular geometry. Temperature gradient change occurring due to the nonuniform heat-generating source and non-homogeneous heat dissipation may also introduce complex deformations to the triangular system geometry and individual components. More specifically, changes in camera focusing and distortion may directly contribute to the 3D dimensioning error. Additionally, such changes are difficult to control or correct with calibration. Components of a camera module are usually made from multiple materials with significantly different thermal expansion coefficients (CTEs). For example, the materials may include silicon sensor with 3.5 ppm/C, glass lens 9 ppm/C, plastic parts >60 ppm/C. Such a combination introduces challenges in compensating for the changes in pattern image positions on the image sensor introduced by the thermal expansion.

Applicant has identified a number of deficiencies and problems associated with conventional housing and apparatuses for dimensioning devices. Through applied effort, ingenuity, and innovation, many of these identified problems have been solved by developing solutions that are included in embodiments of the present disclosure, many examples of which are described in detail herein.

BRIEF SUMMARY

Accordingly, in at least one aspect, the present disclosure provides an assembly and system for optical dimensioning. It should be appreciated that embodiments of the present disclosure are not limited to the explicit embodiments depicted herein. In this regard, the scope and spirit of the disclosure herein is not limited to the specific embodiments depicted.

In some example embodiments of the dimensioning assembly, the dimensioning assembly includes a camera module having one or more image sensors and an imaging lens assembly. The example dimensioning assembly further includes a light emitting assembly disposed near the camera module. The example dimensioning assembly further includes a single piece optical component, where the single piece optical component comprises a light collimator component orientated to receive light from the light emitting assembly and output collimated light. The single piece optical component further comprises a light splitter component orientated to receive the collimated light and split the collimated light into a first light beam and a second light beam. The single piece optical component further comprises a first pattern generator component orientated to produce a first pattern using the first light beam. The single piece optical component further comprises a second pattern generator component orientated to produce a second pattern using the second light beam. The example dimensioning assembly further comprises a processing system configured to detect positions of elements of the first pattern and detect positions of elements of the second pattern.

In some example embodiments of the dimensioning assembly, the first pattern generator component comprises a first reflective beam bender and a first diffractive pattern generator; and the second pattern generator component comprises a second reflective beam bender; and a second diffractive pattern generator.

In some example embodiments of the dimensioning assembly, the single piece optical component is made of injection molding plastic or glass.

In some example embodiments of the dimensioning assembly, the light emitting assembly comprises a mounted laser source module associated with a 45-degree rotated shape feature, and the light collimator component, the light splitter component, and the first pattern generator produce the first pattern, and wherein the light collimator component, the light splitter component, and the second pattern generator produce the second pattern, with the first pattern at a 90-degree shape feature rotation from the second pattern.

In some example embodiments of the dimensioning assembly, the first pattern is associated with a first pattern orientation mask, and the second pattern is associated with a second pattern orientation mask, and wherein the first pattern generator and the second pattern generator are orientated to interlace the first pattern and the second pattern based on a baseline offset.

In some example embodiments of the dimensioning assembly, the first pattern and the second pattern are orientated to match a pattern pitch. In other example embodiments of the dimensioning assembly, the first pattern and the second pattern are orientated based on an off-pitch offset from a pattern pitch.

In some example embodiments of the dimensioning assembly, the first pattern and the second pattern comprise a shared pattern, and wherein the first pattern generator and the second pattern generator are orientated to interlace the first pattern and the second pattern based on a baseline offset.

In some example embodiments of the dimensioning assembly, the first pattern and the second pattern are associated with a complemented dual-pattern, the first pattern generator component and the second pattern generator component orientated to project the first pattern and the second pattern to form the complemented dual-pattern. In some such example embodiments of the dimensioning assembly, the first pattern and the second pattern are associated with a shared pattern, wherein the first pattern is associated with a first pattern feature, and wherein the second pattern is associated with a second pattern feature.

In at least another aspect, another example dimensioning assembly is provided. The example dimensioning assembly includes a light emitting assembly. The example dimensioning assembly further includes a full field modulation mask disposed to modulate, into a random pattern, light received from the light emitting assembly. The example dimensioning assembly further includes projecting optics comprising at least a projection lens disposed to project the random pattern without duplication optical elements.

In some embodiments of the dimensioning assembly, the projecting optics further comprises a field correction component. In some embodiments of the dimensioning assembly, the projecting optics further comprises a uniform intensity distribution component.

In some embodiments of the dimensioning assembly, the dimensioning assembly further comprises a camera module having one or more image sensors and an imaging lens assembly; and a processing system configured to detect and analyze positions of elements of the generated patterns.

In some embodiments of the dimensioning assembly, the random pattern comprises a binary state produced by a physical mask layer or a modulation scheme. In some such embodiments, each feature of the binary state random pattern is associated with an elongated line orientation.

In some embodiments of the dimensioning assembly, the random pattern comprises a multi-state random pattern comprising features associated with at least three states. In some such embodiments of the dimensioning assembly, each feature state of the multi-state random pattern is associated with a different feature position shift.

In at least another aspect, a computer-implemented method of analyzing a dual-pattern is provided. The computer-implemented method may be performed by computing hardware described herein, for example by a processing system. The computer-implemented method comprises projecting a full-field dual-pattern to a full projection field, the full-field dual-pattern comprising a full-field left pattern and a full-field right pattern associated with a baseline offset. The computer-implemented method further includes detecting the full-field left pattern using a first directional filter. The computer-implemented method further includes detecting the full-field right pattern using a second directional filter. The computer-implemented method further includes dimensioning an object included in the full projection field based on the detected full-field left pattern, the detected full-field right pattern, and the baseline offset.

In some embodiments of the computer-implemented method, the full-field left pattern comprises left features associated with a left feature type and the full-field right pattern comprises right features associated with a right feature type, the first directional filter matches the left feature type, and the second directional filter matches the right feature type. In some embodiments of the computer-implemented method, dimensioning the object comprises identifying a portion of the full-field left pattern; identifying a portion of the full-field right pattern matching the portion of the full-field left pattern; determining a dimensioning offset between features of the portion of the full-field left pattern and features of the portion of the full-field right pattern; and calculating the dimensioning parameters based on the dimensioning offset and the baseline offset. In some such embodiments of the computer-implemented method, identifying the portion of the full-field right pattern matching the features of the portion of the full-field left pattern comprises determining an left encoded pattern for the portion of the full-field left pattern; and detecting, using a local area coded feature matching algorithm, the portion of the full-field right pattern representing a right encoded pattern, wherein the left encoded pattern matches the right encoded pattern.

In some embodiments of the computer-implemented method, the baseline offset is associated with a fixed pitch grid.

In some embodiments of the computer-implemented method, dimensioning the object comprises detecting a left local area pattern portion and a right local area pattern portion using a local area pattern correlation algorithm, wherein a left feature set of the left local area pattern portion corresponds to a right feature set of the right local area pattern portion; determining a dimensioning offset between the left feature set of the left local area pattern portion and the right feature set of the right local area pattern portion; and calculating the dimensioning parameters based on the dimensioning offset and the baseline offset.

In at least another aspect, an example apparatus for analyzing a dual-pattern is provided. The example apparatus comprises at least one processor and at least one memory. The at least one memory stores computer-coded instructions therein. The computer-coded instructions, in execution with the at least one processor, configure the apparatus to project a full-field dual-pattern to a full projection field, the full-field dual-pattern comprising a full-field left pattern and a full-field right pattern associated with a baseline offset. The example apparatus is further configured to detect the full-field left pattern using a first directional filter. The example apparatus is further configured to detect the full-field right pattern using a second directional filter. The example apparatus is further configured to dimension an object included in the full projection field based on the detected full-field left pattern, the detected full-field right pattern, and the baseline offset.

In some embodiments of the apparatus, the full-field left pattern comprises left features associated with a left feature type and the full-field right pattern comprises right features associated with a right feature type, the first directional filter matches the left feature type, and the second directional filter matches the right feature type.

In some embodiments of the apparatus, to dimension the object, the apparatus is configured to identify a portion of the full-field left pattern; identify a portion of the full-field right pattern matching the portion of the full-field left pattern; determine a dimensioning offset between features of the portion of the full-field left pattern and features of the portion of the full-field right pattern; and calculate the dimensioning parameters based on the dimensioning offset and the baseline offset.

In some such embodiments of the apparatus, to identify the portion of the full-field right pattern matching the features of the portion of the full-field left pattern, the apparatus is configured to determine an left encoded pattern for the portion of the full-field left pattern; and detect, using a local area coded feature matching algorithm, the portion of the full-field right pattern representing a right encoded pattern, wherein the left encoded pattern matches the right encoded pattern.

In some embodiments of the apparatus, the baseline offset is associated with a fixed pitch grid. Additionally or alternatively, in some embodiments of the apparatus to dimension the object, the apparatus is configured to detect a left local area pattern portion and a right local area pattern portion using a local area pattern correlation algorithm, wherein a left feature set of the left local area pattern portion corresponds to a right feature set of the right local area pattern portion; determine a dimensioning offset between the left feature set of the left local area pattern portion and the right feature set of the right local area pattern portion; and calculate the dimensioning parameters based on the dimensioning offset and the baseline offset.

In at least another aspect, a computer program product for analyzing a dual-pattern is provided. The computer program product comprises at least one non-transitory computer-readable storage medium having computer program instructions thereon. The computer program instructions, when in execution with a processor, are configured to project a full-field dual-pattern to a full projection field, the full-field dual-pattern comprising a full-field left pattern and a full-field right pattern associated with a baseline offset. The computer program product is further configured to detect the full-field left pattern using a first directional filter. The computer program product is further configured to detect the full-field right pattern using a second directional filter. The computer program product is further configured to dimension an object included in the full projection field based on the detected full-field left pattern, the detected full-field right pattern, and the baseline offset.

In some embodiments of the computer program product, the full-field left pattern comprises left features associated with a left feature type and the right pattern comprises right features associated with a right feature type, where the first directional filter matches the left feature type, and where the second directional filter matches the right feature type.

In some embodiments of the computer program product, to dimension the object, the computer program product is configured to identify a portion of the full-field left pattern; identify a portion of the full-field right pattern matching the portion of the full-field left pattern; determine a dimensioning offset between features of the portion of the full-field left pattern and features of the portion of the full-field right pattern; and calculate the dimensioning parameters based on the dimensioning offset and the baseline offset.

In some such embodiments of the computer program product, to identify the portion of the full-field right pattern matching the features of the portion of the full-field left pattern, the computer program product is configured to determine an left encoded pattern for the portion of the full-field left pattern; and detect, using a local area coded feature matching algorithm, the portion of the full-field right pattern representing a right encoded pattern, wherein the left encoded pattern matches the right encoded pattern.

In some embodiments of the computer program product, the baseline offset is associated with a fixed pitch grid.

In some embodiments of the computer program product, to dimension the object, the computer program product is configured to detect a left local area pattern portion and a right local area pattern portion using a local area pattern correlation algorithm, wherein a left feature set of the left local area pattern portion corresponds to a right feature set of the right local area pattern portion; determine a dimensioning offset between the left feature set of the left local area pattern portion and the right feature set of the right local area pattern portion; and calculate the dimensioning parameters based on the dimensioning offset and the baseline offset.

BRIEF DESCRIPTION OF THE DRAWINGS

FIGS. 2A-2D schematically depict relative positions of a camera module and pattern generators within a dimensioning assembly, according to example embodiments;

FIGS. 11A and 11B depict example parameters and margins for random patterns according to example embodiments;

DETAILED DESCRIPTION

Figure 1A:
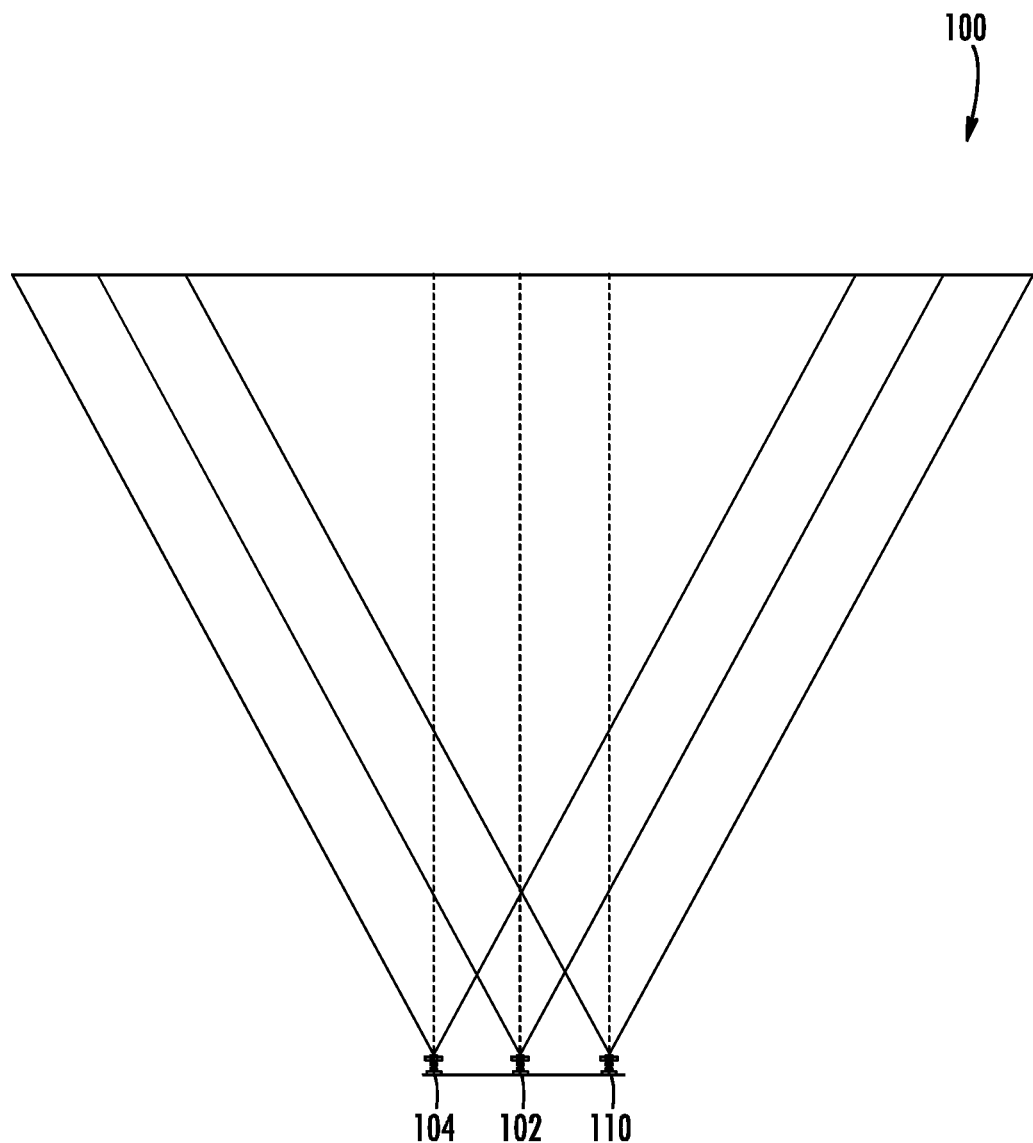
FIG. 1A schematically depicts a dimensioning assembly, according to an example embodiment.

The present disclosure now will be described more fully hereinafter with reference to the accompanying drawings in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout. As used herein, positional terms may be used in examples to describe the relative position of certain components or portions of components. Furthermore, as would be appreciated to one of ordinary skill in the art in light of the present disclosure, the terms "substantially" and "approximately" indicate that the referenced element or associated description is accurate to within applicable engineering tolerances.

Overview

Projectors and corresponding detection systems may utilize structured light for various 3D sensing applications. For example, structured light may be produced and projected into a field to enable dimensioning of an object within the field. Such systems may utilize, in some examples, one or more projectors for generating the structured light, one or more cameras for capturing the structured light, and processing circuitry for performing one or more dimensioning algorithms (or other processes for other applications utilizing the structured light).

Depth parameters associated with dimension parameters of an object may be calculated by analyzing a random pattern that is projected onto a surface. For example, depth information may be calculated from the correlation between the random pattern and a corresponding image captured by an image capture device. To better improve the matching process, the projected pattern may be unique or semi-unique to prevent mismatching of the pattern due to repeated patterns.

Embodiments of the present disclosure produce a non-repeating full field pattern that improves and/or otherwise contributes to the aforementioned matching process. In some examples, a non-repeating full field pattern is projected over a full projection field, such that no segment of the non-repeating full field pattern is repeated throughout the full projection field. In some embodiments, a full field area modulation mask may be used to generate the random pattern. The full field area modulation mask may be modulated such that it is associated with a particular state, for example a binary-state mask or a multi-state mask. Such embodiments may reduce mismatching, improve robustness of the overall system, and simplify the optical structure of the system to minimize manufacture cost and improve manufacturer stability.

Dual-pattern systems may also be utilized to further improve projection accuracy, stability, and matching. Dual-pattern systems may be constructed to avoid problems in pattern distinguishing and matching. In this regard, distinguishing between the dual-patterns generated by the dual pattern system may be difficult due to overlap or other projection problems due to component wear, misalignment, or the like. For example, where two projectors and/or pattern generators are used, the system may be improved using configurations to produce patterns that are distinguishable in spite of projection errors such as pattern overlap.

Embodiments of the present disclosure utilize a single piece optical component to generate dual patterns. The single piece optical component, in some embodiments, includes a single projector optics and a light emitting assembly. In some embodiments, the light emitting assembly may include a single light generation source used to produce two patterns. In other embodiments, the light emitting assembly may include multiple light generation sources used to produce one or both patterns. In other embodiments, the single piece optical component may be configured to receive light from multiple light emitting assemblies. The single piece optical component, in some embodiments, comprises a light collimator, beam splitter, beam benders, and pattern generators. The single piece optical component, in some embodiments, is associated with a light emitting apparatus for generating light beams used to produce dual patterns.

The dual pattern systems, for example comprising a single piece optical component, may output particular patterns coded for improved alignment and to avoid unwanted overlap. The particular patterns may be designed such that the patterns may still function with potential overlap between features. For example, in some embodiments, the two patterns may form a dual-pattern. In other examples, the two patterns may be identical patterns interlaced to form an interlaced dual-pattern.

In yet further example embodiments, the two patterns may form a complementary dual-pattern. For example, in some embodiments, a first, left pattern is produced that includes features of a first, left feature type, and a second right pattern is produced that includes features of a second, right feature type. The left and right feature types may be separately detectable, for example using directional filtering or spectral filtering with different filters. The filters may match the left feature type and right feature type.

Embodiment apparatuses, systems, methods, or the like, may utilize a single piece optical component for producing non-repeating full field dual-patterns. Such embodiments improve accuracy and improve pattern mismatching, improving overall system robustness. The simplified structure may further lower cost while maintaining these advantages in pattern detection and analysis.

Example System Configurations, Apparatuses, and Implementations

In some examples, dual-pattern measurement allows for the extraction of information based on a ratio of the image separation of the same point from two or more patterns to the image distance between adjacent points from the same pattern. Such an approach may offer various benefits. For example, a camera can be at any location or orientation, and any variation in the relative position of the camera will not affect or will minimally affect the result of the measurements. Additionally, identical patterns with a predetermined separation can be generated from two identical projectors, or a single projector with a beam splitter. Two identical projecting assemblies can exhibit identical or almost identical variations, which, in some examples, may not introduce relative positioning error. Indeed, results obtained with the single projector with a beam splitter can be free from minor pattern pair difference contributions. Moreover, a dual-pattern image with known pattern separation can produce a 3D dimensioning result regardless of changes in camera focusing, distortion and magnification. Change in image position on the sensor introduced by thermal expansion may not affect the outcome, as the result is the ratio of pattern image separation to the pattern image base feature.

Potential applications of 3D optical dimensioning system include but are not limited to: object dimensioning to measure the length, width, height, volume, and irregularity, such as potential package damage in a shipment; zero contrast (surface profile only) direct product marking (DPM) barcode reading, including sensing with a mobile 3D sensor; 3D contour mapping for image recognition; and motion and gesture sensing for non-contact user interface, e.g. in electronic equipment.

Additionally or alternatively, various pattern generation, detection, and decoding techniques may be utilized. For example, example embodiments disclosed herein may provide various detectable and/or decodable patterns. Such patterns may include, without limitation, interlaced dual-patterns, complemented, identical dual-patterns, or the like. Additionally or alternatively, embodiments may produce non-repeating full field patterns using to reduce or eliminate orientation errors during image capture and processing.

FIG. 1A shows a dimensioning assembly 100, according to an example embodiment. The assembly 100 includes a camera module 102 having one or more image sensors and an imaging lens assembly. A first pattern generator 104 is disposed proximate to the camera module 102. A second pattern generator 110 is disposed near the camera module 102 and is spaced apart from the first pattern generator 104.

The assembly 100 may, additionally or alternatively in some embodiments, include or otherwise be associated with a processor system that is configured to detect and analyze positions of elements of the generated patterns. The processing system 116 can be configured to detect and analyze positions of equivalent elements of the generated patterns. Additionally or alternatively, the processing system 116 can be configured to detect and analyze positions of adjacent elements of at least one of the patterns. The assembly 100 can further include one or more additional pattern generators disposed near the camera module 102.

In some examples, the first pattern generator includes, or is associated with, a first laser diode and a first pattern projection assembly. Similarly, in some examples, the second pattern generator includes, or is associated with, a second laser diode and a second pattern projection assembly. In some embodiments, the first and/or second pattern projection assembly can include a projection lens and a pattern die and/or a collimating lens and a diffractive optical element. The first and the second pattern projection assemblies are, in some embodiments, configured to generate identical patterns. The first and/or second laser diodes associated with each pattern generator can comprise a vertical-cavity surface-emitting laser. Alternatively or additionally, in other embodiments, the first and/or second laser diodes associated with each pattern generator can comprise an edge-emitting laser.

In an example embodiment, the first and second pattern generators 104 and 110, respectively, can be placed in a position that is equidistant from the camera module. In other embodiments, for example, the first pattern generator and second pattern generators 104 and 110, respectively, can be placed in parallel, where the camera module is placed at a point between the pattern generators. It should be appreciated that, in some embodiments, the camera module and/or first and second pattern generators may be oriented such that the projected patterns are similarly projected (e.g., not distorted or similarly distorted).

Figure 1B:
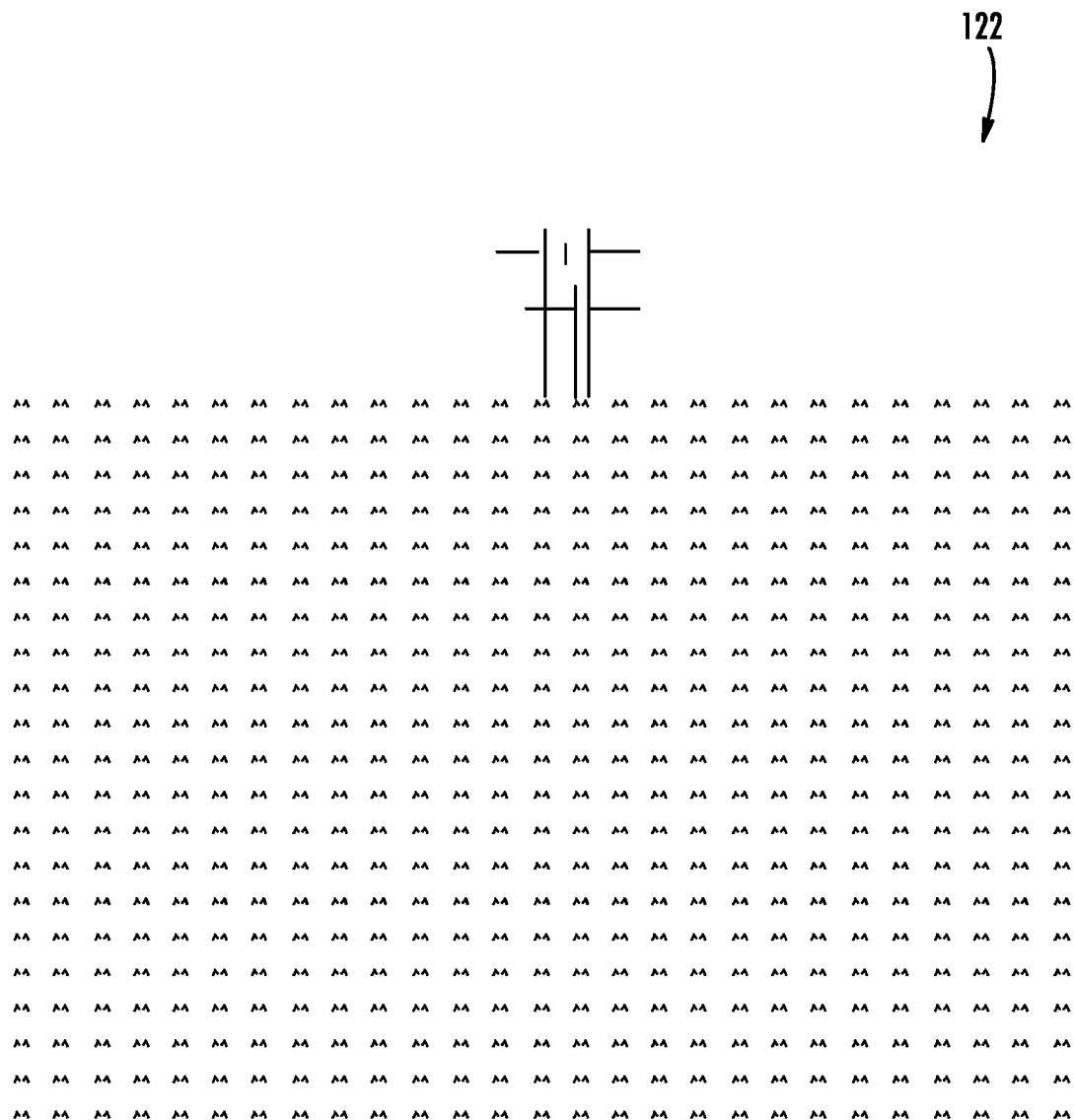
FIG. 1B schematically depicts a dual pattern produced by the dimensioning assembly, according to an example embodiment.

FIG. 1B shows an exemplary embodiment of a dual pattern 122 produced by the dimensioning assembly 100. In some examples, a depth can be calculated based on the image separation of the same point from two identical patterns. Specifically:

$$\text{Depth} = f(s/t), \tag{1}$$

where s is image separation of the same point from two patterns, and t is image distance between adjacent points of the same pattern (as shown in FIG. 1B).

FIGS. 2A-2D schematically depict relative positions of a camera module 202 and pattern generators 204 within a dimensioning assembly, according to several embodiments. FIGS. 2A-2D show relative positions of the camera module 202 and the patter generators 204 from the perspective of looking down from a top onto the dimensioning assembly, with the patterns being projected toward a bottom of the drawings; the horizontal lines represent mounting surfaces.

Figure 2A:
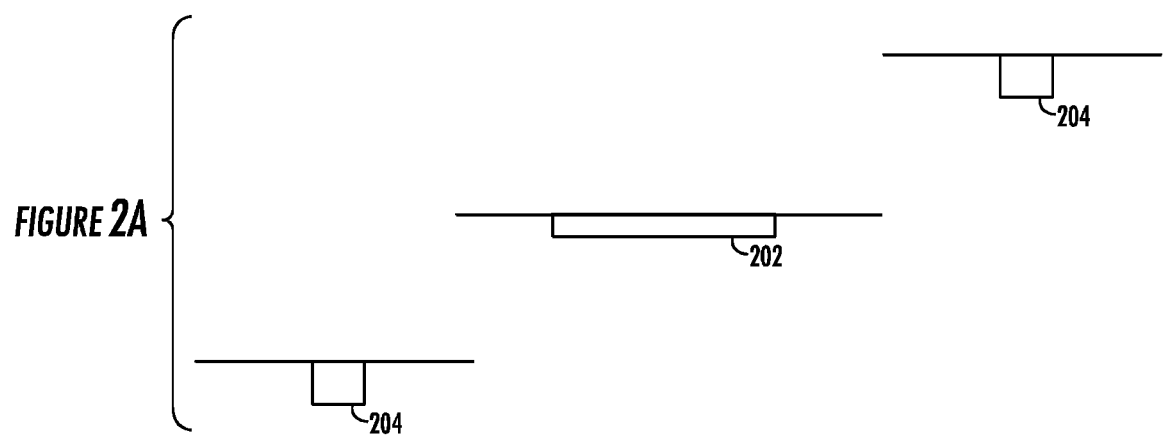
Figure 2B:
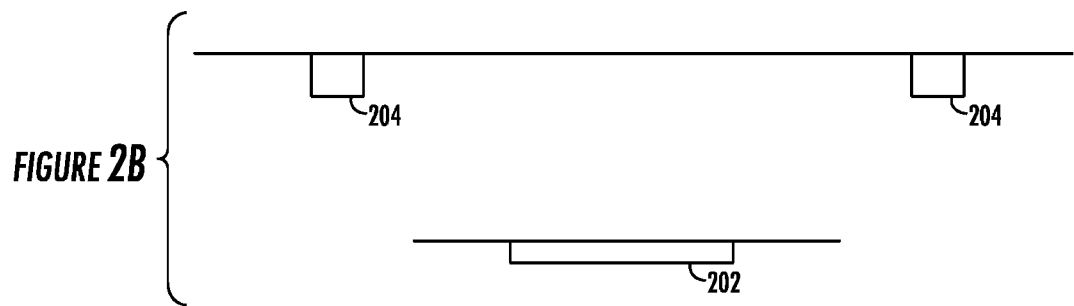

In some embodiments, the camera module 202 and two or more pattern generators 204 can be located on the same plane, whereas in other embodiments, the camera module 202 and pattern generators 204 can be located on different planes. For example, the camera module 202 can be located on one plane, and the pattern generators 204 can be located on a different plane, which can be in front of the camera module 202 (FIG. 2B), behind the camera module 202 (FIG. 2C), or a combination of in front of and behind (FIG. 2A). Alternatively, the camera module 202 can be located on one plane and the pattern generators 204 can be located on one or more arcs, which can similarly be in front of the camera module 202, behind it, or both (FIG. 2D). Two pattern generators 204 are shown in FIGS. 2A-2D for illustrative purposes; however some example embodiments may include a different number of pattern generators 204.

Although FIGS. 2A-2D show offsetting the pattern generators 204 from the camera module 202 in the Y direction, in some embodiments they can instead, or additionally, be offset in the X and/or Z directions. Mixed configurations where the pattern generators 204 are offset in non-symmetrical ways are also possible.

Figure 3A:
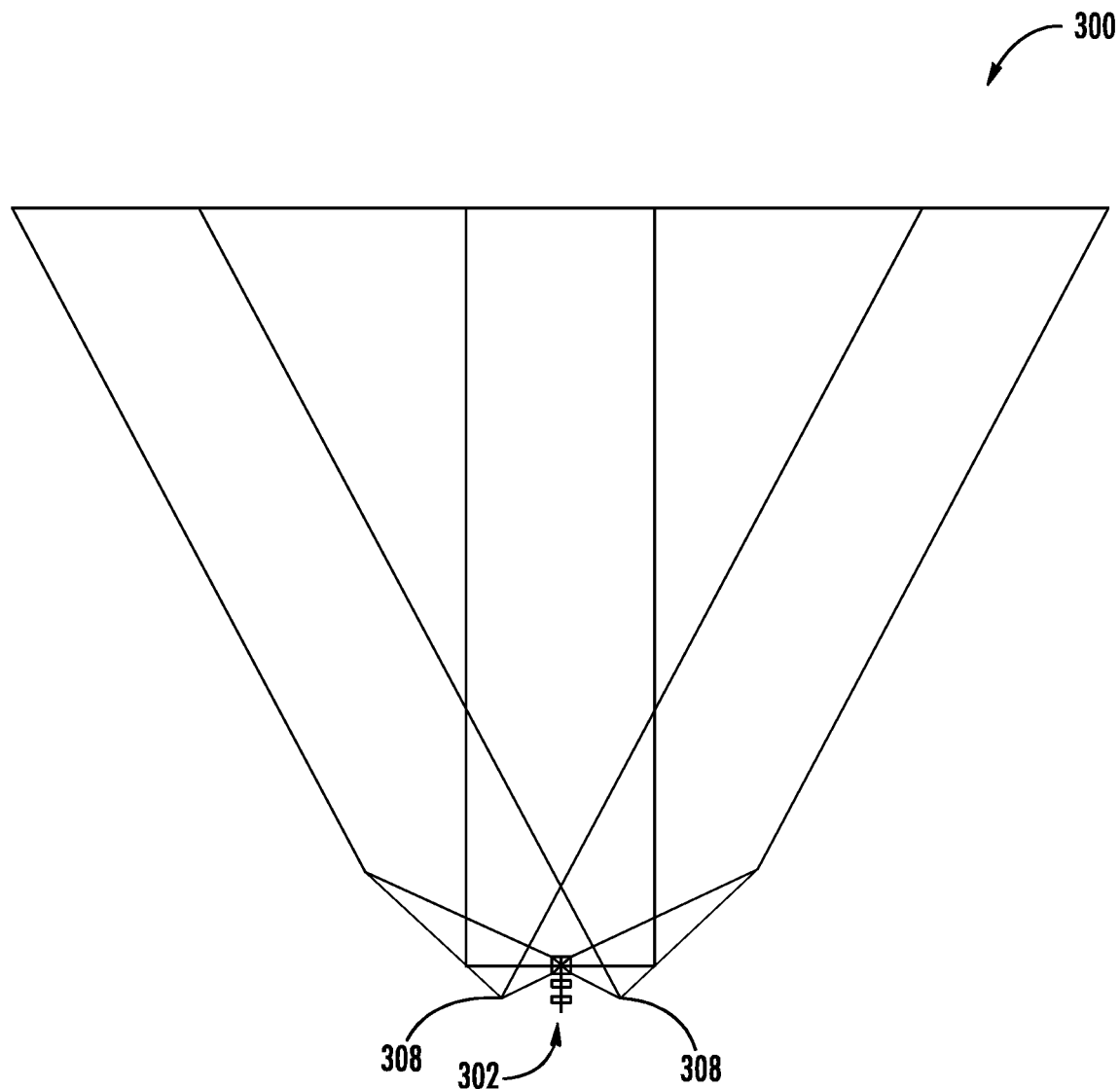
FIG. 3A schematically depicts an optical dimensioning system, according to an example embodiment.
Figure 3B:
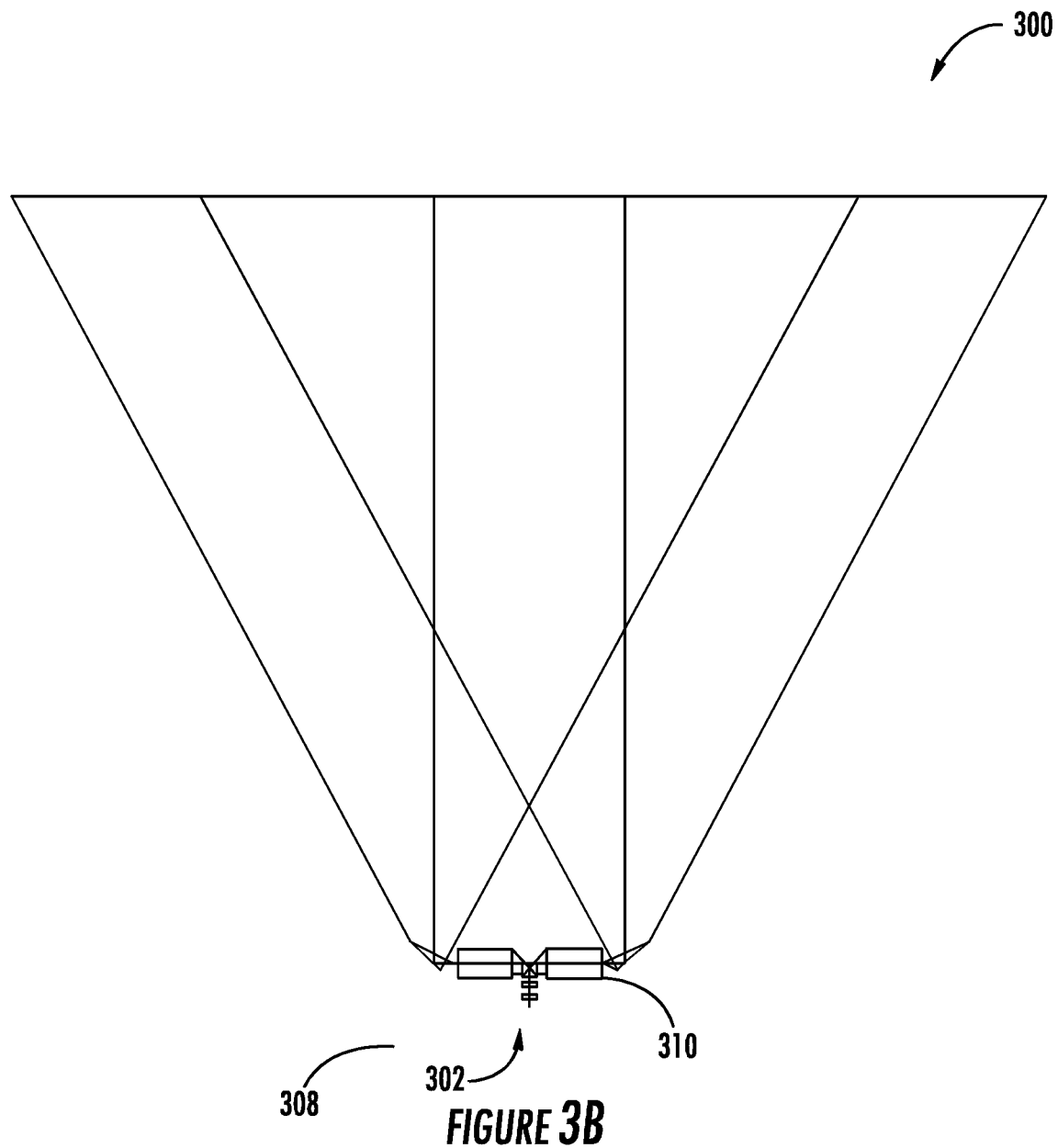
FIG. 3B schematically depicts an optical dimensioning system with a splitting lens according to an example embodiment.

FIGS. 3A and 3B show exemplary embodiments of an optical dimensioning system 300. According to an embodiment, the system 300 includes one or more light emitting assemblies 302. In some examples, light emitting assemblies 302 is configured to project a predetermined pattern on an object. Additionally or alternatively, in some embodiments, the system 300 includes an imaging assembly that is configured to sense light scattered and/or reflected of the object, and to capture an image of the object while the pattern is projected. Additionally or alternatively, in some embodiments, the system 300 includes a processing assembly that is configured to analyze the image of the object to determine one or more dimension parameters of the object.

In an embodiment, the imaging assembly can include one or more image sensors with an imaging lens and/or a first beam splitter, for example beam splitter 308, adapted for multi-imaging sensing, and one or more spectral filters. The one or more light emitting assemblies 302 can include a pattern generator and a second beam splitter adapted for pattern projection. Additionally, the beam splitter can include, or otherwise be associated with, a relay lens 310 (shown in FIG. 3B). Such a configuration may be used to reduce the size of the system, and can, in some examples, be beneficial for application with space limitation, such as mobile devices.

The optical dimensioning system 300 may thus be used to produce two patterns, and project the patterns onto a field. The patterns may be specially designed and/or configured to be analyzed, for example using a dimensioning process, to enable accurate dimensioning of an object within the field. For example, the patterns may be projected onto the object within the field. The optical dimensioning system 300 may capture an image of the projected patterns, and analyze the image to calculate, determine, or otherwise identify dimension parameters associated with the object. In an embodiment, the one or more dimension parameters of the object include a length, width, and/or height of the object. In other embodiments, the system 300 may be used for various other processes utilizing analysis of the projected patterns. In this regard, the patterns may be analyzed to calculate, determine, or otherwise identify particular depth information, encoded information, encoded data, or the like. For example, the system 300 can be configured for scanning a zero contrast direct product marking barcode, image recognition with 3D contour mapping, and/or motion and/or gesture sensing for non-contact user interface.

Figure 4:
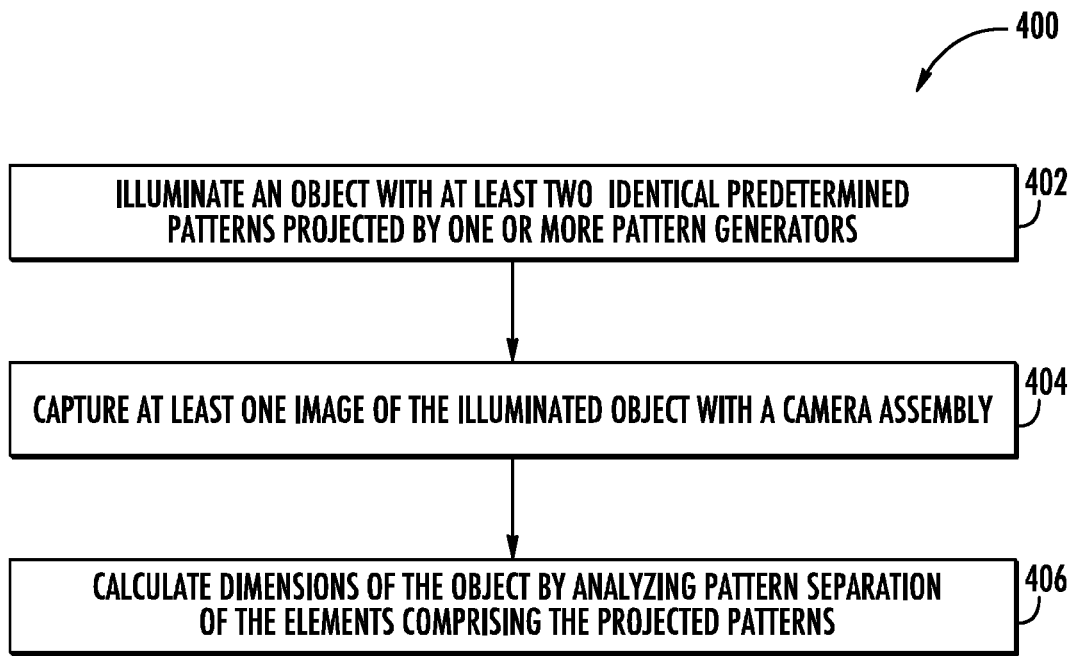
FIG. 4 schematically depicts a method for dual-pattern optical dimensioning, according to an example embodiment.

FIG. 4 shows a method 400 for dual-pattern optical dimensioning, according to an embodiment. At 402, an object is illuminated with at least two identical predetermined patterns projected by one or more pattern generators. In some embodiments, the predetermined patterns may be projected by one or more of the apparatuses, systems, or devices described herein, for example with respect to FIG. 1, 3A, 3, or 7. At 404, at least one image of the illuminated object is captured with a camera assembly. The camera assembly, in some embodiments for example, may be integrated with, or associated with the device, system, apparatus, or the like utilized to produce the two patterns. In other embodiments, the camera assembly may be separate from said device, system, or apparatus. At 406, dimensions of the object are calculated by analyzing pattern separation of the elements comprising the projected patterns. In this regard, for example, the captured image may be analyzed to separate the two projected patterns, for example as described below with respect to FIG. 12. The separated patterns as captured may then be used to calculate, determine, or otherwise identify the dimensioning parameters of an object onto which the patterns were projected. For example, Formula 1 may be used to calculate the separation and associated dimensioning parameters.

In an embodiment, the predetermined pattern can include a point grid. The method 400 can include controlling one or more pattern separation parameters. Additionally, illuminating an object at 402 can include illuminating an object with a projector operably coupled to a beam splitter.

The patterns may be processed in a myriad of ways, and in some contexts may be analyzed via different methods depending on the features of each of the generated patterns. For example, in some embodiments, the features of the patterns may be encoded based on the shape of the feature (e.g., a dot for 0 and an elongated line for 1), and image processing feature filtering may be utilized to separate the patterns (e.g., using directional filtering). Additionally or alternatively, the features of the patterns may be encoded using particular spectral features, for example two patterns illuminated with different light spectrums associated with differing colors, such that the patterns may be identified using spectral filtering. In some embodiments, the patterns may be projected associated with a grid pattern distribution, and the patterns may be separated using grid pattern searching and matching to identify and separate the patterns. In this regard, the patterns may be separated in a circumstance where the patterns are interlaced and identical patterns. The patterns may be projected based on the grid pattern such that each row of features are separated, for example in a vertical direction, to enable improved identifying and separating of the patterns. For example, for coded patterns, the patterns may be searched and matched using one or more local area coded feature matching algorithms. For patterns generated associated with a fixed pitch grid pattern, the patterns may be identified and separated using grid searching and matching algorithms. For random distributed patterns, the patterns may be identified and separated using local area pattern correlation to identify and/or separate the patterns.

In some embodiments, some of the operations described above with respect to the flow charts and/or data flows may be modified or further amplified. Furthermore, in some embodiments, additional optional operations may be included. Modifications, amplifications, or additions to the operations above may be performed in any combination. In some embodiments, two or more steps of the flowcharts may be performed simultaneously and/or in another order other than the particular order depicted.

Figure 5A:
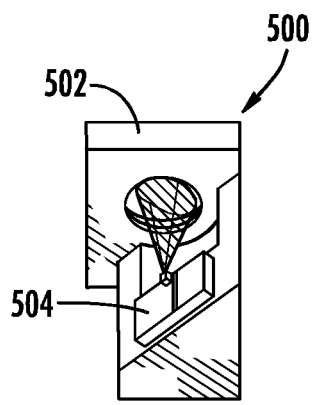
FIGS. 5A-5D depict various views of an example light emitting assembly according to an example embodiment.
Figure 5B:
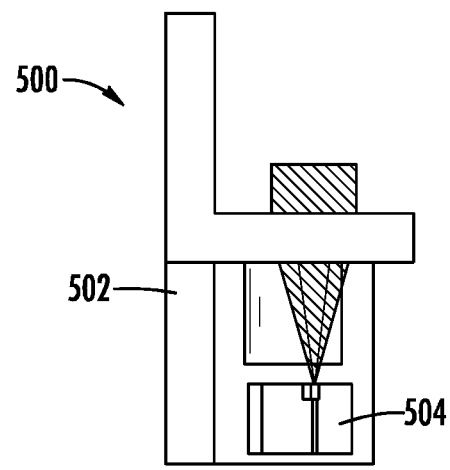
Figure 5C:
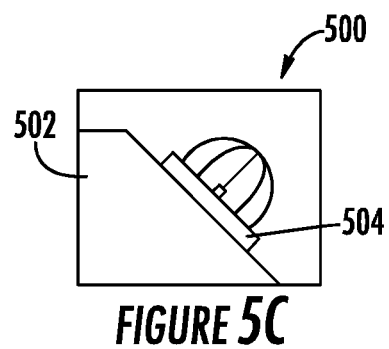
Figure 5D:
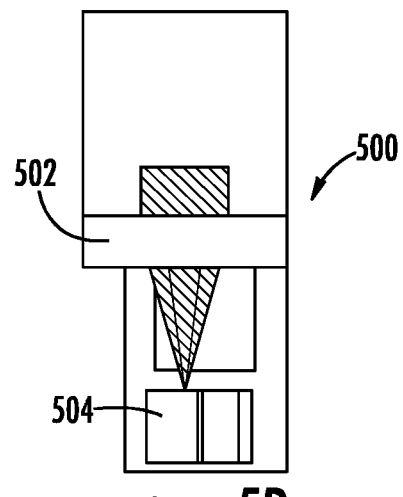

Blocks of the block diagrams and flowchart illustrations support combinations of means for performing specified functions, combinations of steps for performing the specified functions and program instruction means for performing the specified functions. It will also be understood that each block of the diagrams and flowcharts, and combinations of the blocks, can be implemented by special purpose hardware-based computer systems that perform the specified functions or steps, or combinations FIGS. 5A-5D show an exemplary light emitting assembly 500. For example, FIG. 5A shows an example perspective view of the light emitting assembly 500. FIG. 5B shows an example side view of the light emitting assembly 500. FIG. 5C shows an example top view of the light emitting assembly 500. FIG. 5D shows an example back view of the light emitting assembly 500.

Light emitting assembly 500 comprises aperture 502. The aperture may be used for housing and/or mounting various components of the light emitting assembly 500. In some embodiments, aperture 502 is embodied by, houses, or is associated with a heat-sink module. For example, the heat-sink module may embody the aperture 502 for distributing heat generated by components of the light emitting assembly 500, such as by the light generation source 504.

Light emitting assembly 500 further comprises a light generation source 504 which, in some examples, comprises one or more laser modules. For example, in some embodiments, light generation source 504 is embodied by an edge emitting laser diode. In other embodiments, light generation source 504 is embodied by another laser diode type, LED, or the like. In yet other embodiments, light generation source 504 is embodied by another high-intensity light source. Indeed, light generation source 504 may be one or more of any of a myriad of light sources, including coherent light generation source(s) and/or non-coherent light generation sources.

Light generation source 504 may be mounted to the aperture 502 for producing a light beam at a particular angle, for example such that the light produced by the light generation source has a particular orientation. For example, in some embodiments and as illustrated, the light generation source 504 is mounted such that the light produced is at a 45-degree angle. The light generation source 504 may be designed and/or configured to generate light having a particular cross section for use in projecting a corresponding pattern feature. For example, the example light generation source 504 may produce a laser beam having an elliptical cross section, the laser particular cross section rotated at a 45-degree angle, for example with respect to one or more axes (e.g., a mounting axis, or another axis associated with the aperture 502).

In some embodiments, the light generation source 504 may be utilized in one or more projection apparatuses, dimensioning apparatuses, or the like. In some embodiments, only a single light generation source 504 may be utilized. In other embodiments, a plurality of light generation sources, for example multiple of the light generations source 504, may be utilized. It should be appreciated that in some embodiments, the light generation source 504 may be utilized in combination with other light generation sources.

Figure 6A:
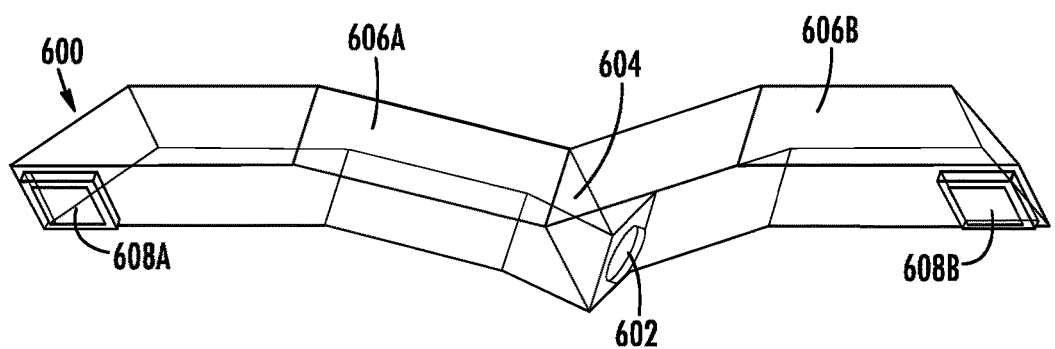
FIGS. 6A-6C depict various views of a single piece optical component according to an example embodiment.
Figure 6B:
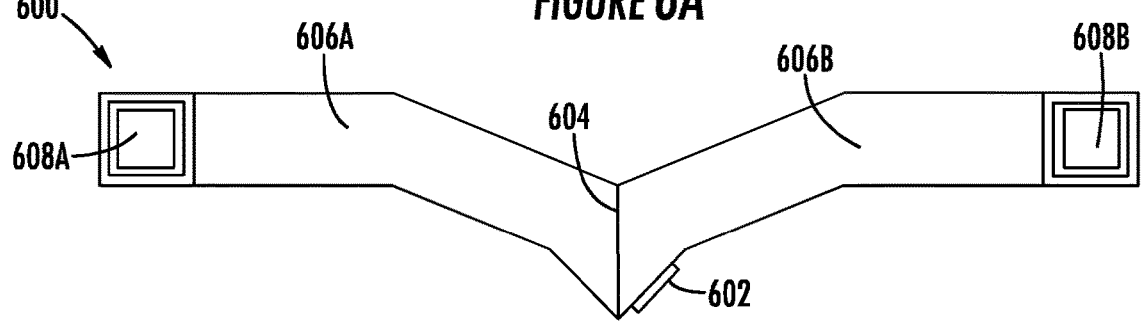
Figure 6C:
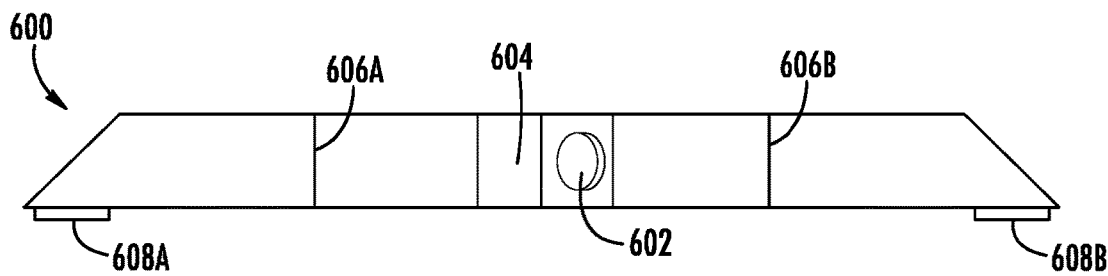

FIGS. 6A-6C illustrate an exemplary single piece optical component 600. For example, FIG. 6A shows an example perspective view of the single piece optical component 600. FIG. 6B shows an example frontal view of the single piece optical component 600. FIG. 6C illustrates an example top view of the single piece optical component 600. In some embodiments, the single piece optical component 600 is a component of a projection apparatus, dimensioning apparatus, or light emitting assembly.

In some examples, single piece optical component 600 comprises a light collimator component 602. The light collimator component 602 may form incoming light into a light beam for generating patterns via the single piece optical component 600. Specifically, in some embodiments, the light collimator component 602 is orientated to receive light from a light generation source, for example to receive a laser beam. In some embodiments, the light collimator component 602 produces collimated light, for example a particular collimated light beam, based on inputted light, for example from a light emitting assembly. In some embodiments, the particular collimated light beam has a particular cross-section or pattern feature based on the source light and/or the light collimator component 602. For example, in some embodiments the collimated light beam may be associated with an elliptical feature rotated at a particular angle, such as a 45-degree angle.

Single piece optical component 600 further comprises a light splitter component 604. In some embodiments, the light splitter component 604 is orientated to receive light, for example such as a collimated light beam, produced or otherwise outputted from the light collimator component 602. The light splitter component 604 splits the received light into two or more light beams. For example, the collimated light may be split into a first light beam and a second light beam, with each light beam produced at a particular angle towards a corresponding light beam bender.

In some embodiments, the light splitter component 604 comprises a beam splitter, such as a grating beam splitter, a prism beam splitter, and/or mirrors beam splitter. The light splitter component 604 may, in some embodiments, alter orientation of the received light associated with a desired feature for corresponding patterns. For example, the light splitter component 604 may generate a first beam associated with the same feature projection as the collimated light, and a second beam associated with a second feature projection rotated 90-degrees from the feature projection of the first beam.

Single piece optical component 600 further comprises a first beam bender, for example left beam bender 606A, and a second beam bender, for example right beam bender 606B. The first beam bender, and similarly the second beam bender may include components to, and/or otherwise be designed, to relay a received light beam to an associated pattern generator. For example, each beam bender may include one or more mirrors, total internal reflection surfaces, relay optics, and/or the like. In some embodiments, each beam bender comprises one or more optical components, or a combination of optical components, for relaying the received light beam.

Single piece optical component 600 further comprises a first diffractive pattern generator, for example left pattern generator 608A, and a second diffractive pattern generator, for example right pattern generator 608B. Each diffractive pattern generator may be designed to receive a light beam and produce a corresponding pattern based on a received light beam. For example, left pattern generator 608A may generate a first, left pattern and right pattern generator 608B may generate a second, right pattern. In some embodiments, each diffractive pattern generator is configured to generate a pattern without use of a particular pattern mask associated with the patterns.

In some embodiments, the left pattern and right pattern may be the same, shared pattern (e.g., an identical pattern). In some embodiments, features of the first pattern and features of the second pattern may be located in the same positions, but the features of each pattern may differ in type, orientation, or the like. For example, the features of the first pattern may be rotated as compared to the features of the second pattern. In other embodiments, the first pattern includes features of a first detectable type, orientation, or the like, which are distinct from second features of a second detectable type, orientation, or the like associated with the second pattern. For example, the first and second pattern may be embodied by any one, or pair, of the patterns described below with respect to FIGS. 10A-10B, and 12A/12B-17.

Additionally or alternatively, in some embodiments, each pattern generator may include projection optics, for example including one or more projection lenses, for producing the corresponding pattern. The first pattern generator 608A and the second pattern generator 608B may be spaced apart by a predetermined separation distance. Additionally or alternatively, the first pattern generator 608A and the second pattern generator 608B may be orientated to produce the first pattern and second pattern to form a dual-pattern, as described herein.

Single piece optical component 600 may be constructed from one or a myriad of materials. A suitable material may be selected based on a desired stability requirement and operating temperature range. In some embodiments, for example, the single piece optical component 600 is constructed of injection molding plastic. In other embodiments, for example, the single piece optical component 600 is constructed of glass. The single piece optical component 600 may be constructed of any of a myriad of materials depending on a target stability.

Figure 7A:
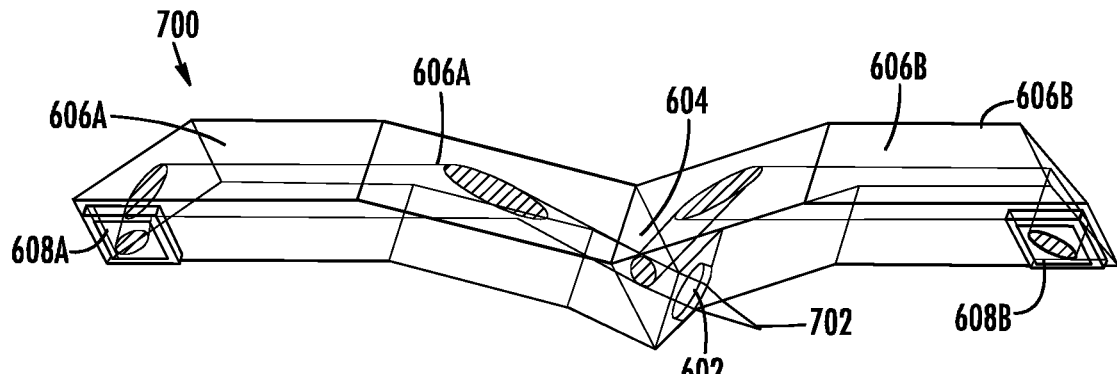
FIGS. 7A-7D depict various views of a single piece optical component associated with a light emitting assembly to product a first pattern and a second pattern according to an example embodiment.
Figure 7B:
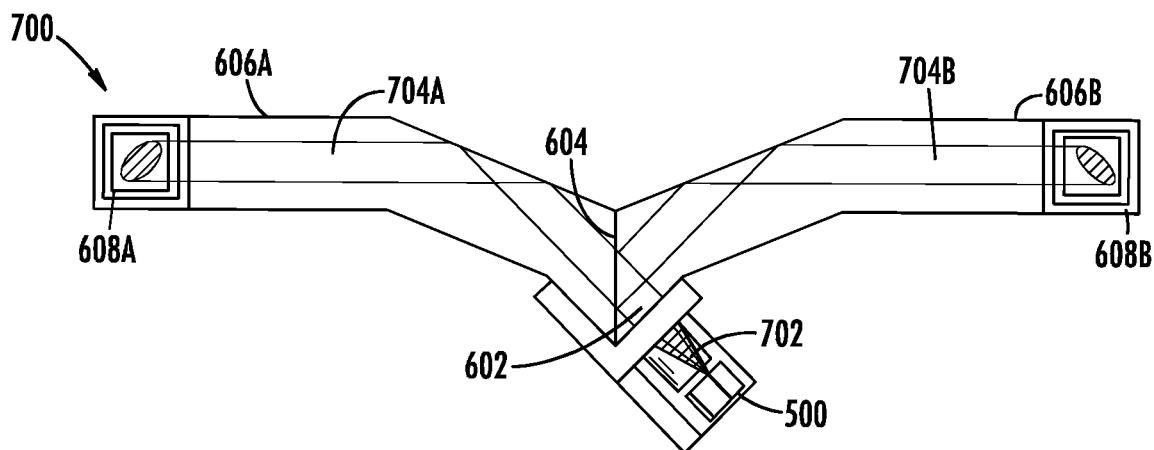
Figure 7C:
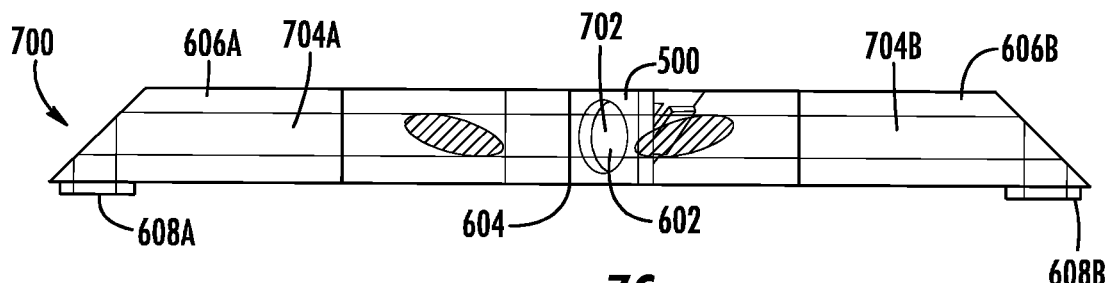
Figure 7D:

FIGS. 7A-7D illustrate various views of an apparatus comprising a single piece optical component associated with a light emitting assembly in operation. For example, FIG. 7A shows an example perspective view of a single-piece dual-pattern projection apparatus 700 comprising the single piece optical component 600 in operation with an example light emitting assembly 500. FIG. 7B shows an example frontal view of the single-piece dual-pattern projection apparatus 700. FIG. 7C illustrates an example top view of the single-piece dual-pattern projection apparatus 700. FIG. 7D illustrates example light beams associated with pattern generation via the example projection apparatus 700, for example for use in one or more generated patterns. In some embodiments, the single-piece dual-pattern projection apparatus 700 embodies, or embodies a component of, a projection apparatus, dimensioning apparatus, or light emitting assembly, as described above.

Specifically, in some examples, single piece optical component 600 receives light 702. For example, the light 702 may be produced by the light emitting assembly 500. In a particular embodiment, for example, 702 may comprise a laser beam produced by light emitting assembly 500 via a light generation source, for example via an edge emitting diode. Further in some embodiments, the light emitting assembly 500 may be secured to, or integrated with, the single piece optical component 600. Additionally, in some embodiments, the light emitting assembly 500 is orientated in a particular manner, for example to produce light at a certain angle with respect to single piece optical component 600 or a component thereof. In other embodiments, alternative and/or additional modules, components, assemblies, and/or light sources may produce light 702. The light 702 may be received by the single piece optical component 600 via a light collimator component, for example light collimator component 602.

Light collimator component 602 may receive the light 702 and produce collimated light based on the received light. In some embodiments, the light splitter component 602 is orientated such that the collimated light produced or otherwise outputted by the light collimator component 602 is received by another component of the single piece optical component 600, for example a light splitter component. The collimated light may be received by the light splitter component 604 for splitting into two or more beams. As illustrated, for example, the collimated light may be split into a first, left light beam 704A, and a second, right light beam 704B. In some embodiments, the light splitter component 604 produces the first, left light beam 704A and second, right light beam 704B such that the two beams are offset, for example via rotation, by a predetermined angle based on the design and/or orientation of the light splitter component 604.

For example, the left light beam 704A and the right light beam 704B may be associated with cross-sections rotated 90-degrees from one another.

The light splitter component 604, in some embodiments, is orientated such that the light beams produced by the light splitter component 604 are received via corresponding pattern generation components to produce particular patterns. For example, as illustrated, single piece optical component 600 comprises a left reflective beam bender 606A and a left pattern generator 608A. The light splitter component 604 may be orientated such that the left light beam 704A is received via the left reflective beam bender 606A and relayed to the left pattern generator 608A. The left pattern generator 608A may, for example, produce a first, left pattern utilizing, based on, or otherwise associated with, the left light beam 704A. For example, the features of the left pattern may be projected based on the left light beam. For example, the left light beam 704A may be associated with a particular cross-section defining a feature of the left pattern.

Similarly, single piece optical component 600 comprises a right reflective beam bender 606B and a right pattern generator 608B. The light splitter component 604 may further be orientated such that the right light beam 704B is received via the right reflective beam bender 606B and relayed to the right pattern generator 608B. The right pattern generator 608B may, for example, generate a particular pattern utilizing, based on, or otherwise associated with, the right light beam 704B, such as a cross section of the right light beam 704B.

In this regard, for example, the left light beam 704A and the right light beam 704B may be altered based on one or more transformations. For example, a transformation may alter the orientation and/or cross-section of the left light beam 704A and/or right light beam 704B based on the orientation of the beam splitter 604, the orientation of the left beam bender 606A, and/or the orientation of the right beam bender 606B. For example, the left light beam 704A may be associated with a left elliptical cross section 710A defining a particular feature of the left pattern. The right light beam 704B may be associated with a right elliptical cross section 710B defining a particular feature of the right pattern. The left elliptical cross section 710A and the right elliptical cross section 710B may be utilized, respectively, by left pattern generator 608A and right pattern generator 608B to generate the corresponding pattern. It should be appreciated that the left light beam 704A and/or right light beam 704B may appear to represent various other cross sections detectable via one or more algorithms, for example via one or more directional filtering algorithms or other image processing algorithms. In an example embodiment, for example, a left filter that matches the feature type of the left feature may be applied to detect the left pattern. Similarly, a right filter that matches the feature type of the right feature may be applied to detect the right pattern.

In some embodiments the left pattern generator 608A and right pattern generator 608B may generate an interlaced dual-pattern. The left and right patterns may be interlaced based on a rectangular grid pattern for separating the left and right patterns. Specifically, the left and right patterns may be separated such that each row between the patterns is separated by predetermined baseline offset in a vertical direction. In this regard, the first row of the left pattern may be separated by the baseline offset to the first row of the right pattern, and the first row of the right pattern may be separated by the baseline offset to the second row of the left pattern, and so on. Thus, the left identical pattern may be identified and separated based on the even rows of the interlaced dual-pattern, for example, and the right pattern may be identified based on the odd rows of the interlaced dual-pattern.

The apparatus 700 may project a left pattern and a right pattern onto a projection field. In some embodiments, the left pattern and/or right pattern may embody one or more non-repeating full field projection patterns projected onto a full projection field. Additionally or alternatively, the left and right pattern may be projected to form a dual-pattern. In some embodiments, the apparatus 700 may be associated with an imaging assembly, camera, image capture apparatus, and/or processing circuitry for performing 3D object dimensioning. For example, the camera, imaging assembly, image capture apparatus, and/or processing circuitry may be adapted for multi-imaging sensing, directional filtering, or application of other spectral filters.

Figure 8A:
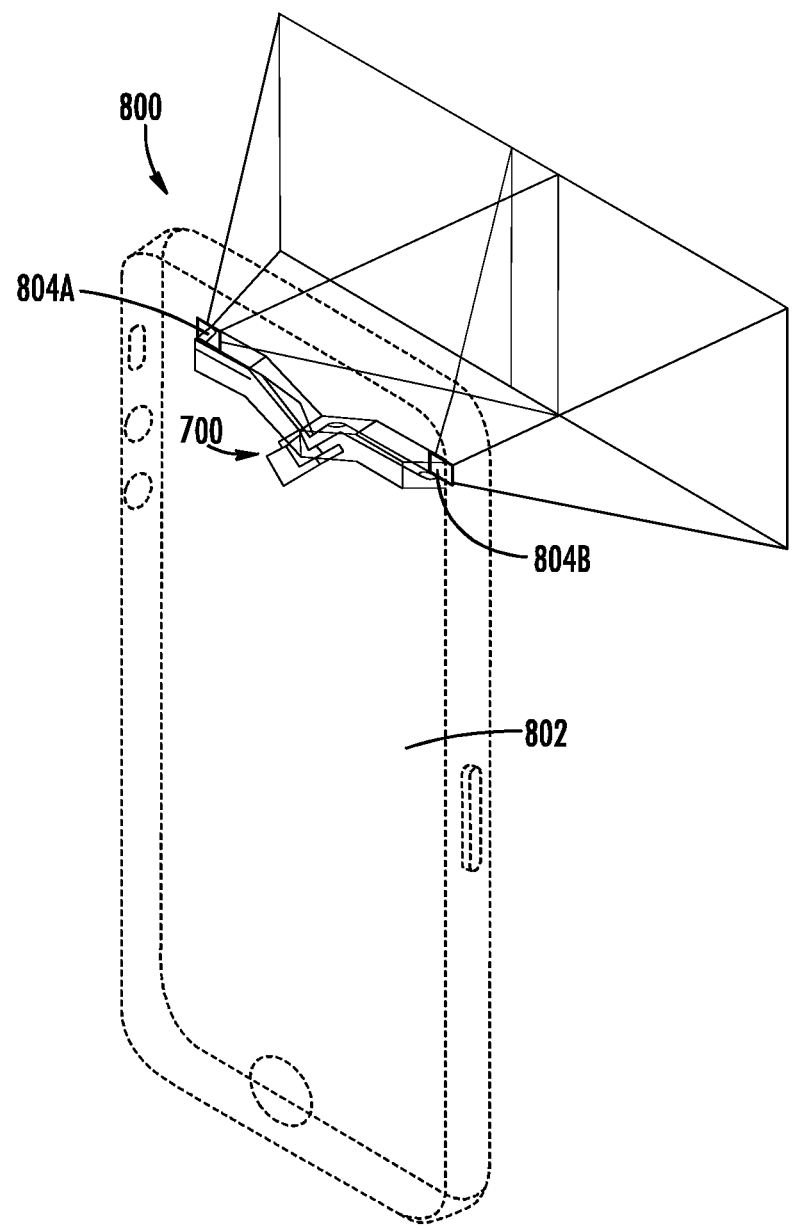
FIGS. 8A and 8B depict various views of an apparatus utilizing a single piece optical component associated with a light emitting assembly according to an example embodiment.
Figure 8B:
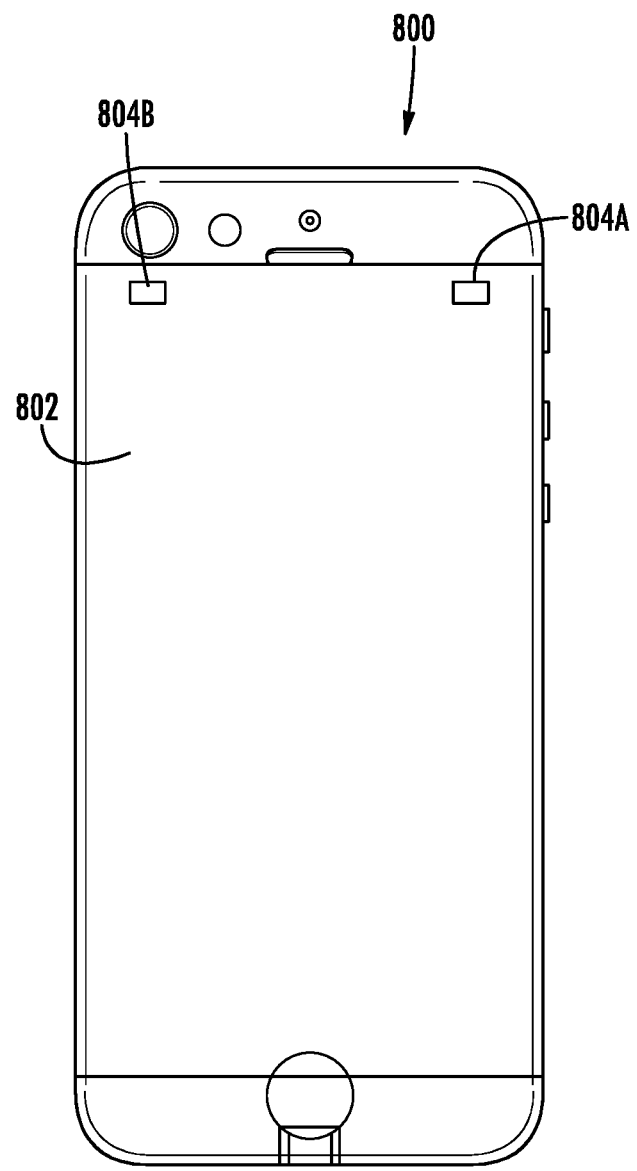

The single piece optical component 600 in conjunction with a light emitting apparatus 500, for example as depicted as apparatus 700, enables inclusion of such apparatuses in compact, space-constrained environments, for example mobile devices and systems. In this regard, FIGS. 8A and 8B depict various views of an apparatus embodying a mobile device comprising a single piece optical component in operation with a light emitting assembly, for example as apparatus 700, according to an example embodiment of the present disclosure. Specifically, as illustrated, FIGS. 8A and 8B depict a particular mobile apparatus, for example mobile device 800. Mobile device 800 may embody any one of a variety of known computing devices, such as a smartphone, tablet, personal digital assistant or the like. Additionally, the mobile device 800 may include additional circuitry, modules, components, or the like not depicted (e.g., processing circuitry, memory, and the like). For example, in some embodiments, the mobile device 800 embodies a smart phone device enhanced via the apparatus 700.

The mobile device 800, as integrated and enhanced by the single-piece dual-pattern projection apparatus 700, may embody an object dimensioning apparatus configured to perform 3D dimensioning of an object. In this regard, the mobile device 800 comprises a device frame 802. The device frame 802 may define a particular area forming the inside of the mobile device 800, and provide a surface for affixing, for example by securing and/or otherwise mounting, the various components, circuitry, and the like associated with mobile device 800. The device frame 802 may be constructed of any of a number of materials dependent on the required thermal, electro-magnetic or other structural requirements, for example glass, metal(s), and/or plastic(s).

The mobile device 800 comprises single-piece dual-pattern projection apparatus 700. In some embodiments, the single-piece dual-pattern projection apparatus 700 is affixed, mounted, fastened, or otherwise secured to the device frame 802. The single-piece dual-pattern projection apparatus 700 may be configured to produce one or more dual-pattern(s) for 3D object dimensioning, as described herein. In some embodiments, the single-piece dual-pattern projection apparatus 700 is configured to communicate with circuitry (not shown) of the mobile device 800 to activate and perform projection. Additionally, circuitry and/or components of the mobile device 800, such as a camera (not shown), may be utilized to capture the projected dual-pattern and/or analyze the dual-pattern to perform a dimensioning process. It should be appreciated that, in other embodiments, the mobile device comprises a dual-projector dual-pattern projection apparatus that is affixed, mounted, fastened, or otherwise secured to the device frame 802. In this regard, the dual-projector dual-pattern projection apparatus may include two projector devices, each configured for projecting a full-field pattern of a particular dual-pattern. In such embodiments, the two projector devices may be configured to project the same pattern, or different patterns, as described herein.

The device frame 802 may include one or more projector windows to enable projection of the dual-patterns by the single-piece dual-pattern projection apparatus 700. For example, device frame 802 may include projector windows 804A and 804B. The projector windows 804A and 804B may define an open are of the device frame 802. The projector windows 804A and 804B may be a predetermined size required for projecting the dual-patterns using single-piece dual-pattern projection apparatus 700 without the device frame 802 impeding the projected pattern(s).

It should be appreciated that, in other embodiments, the single-piece dual-pattern projection apparatus 700 may be implemented into another mobile device, apparatus, or the like. For example, an alternative handheld device may include the single-piece dual-pattern projection apparatus 700 for projecting a dual-pattern, such as for 3D object dimensioning. Alternatively, in other embodiments, the single-piece dual-pattern projection apparatus 700 may further comprise, or otherwise be associated with attachment means for mounting or affixing the apparatus 700 external to the mobile device 800. In this regard, the particular apparatus depicted in FIGS. 8A and 8B is for illustration and not meant to limit the scope or spirit of the disclosure herein.

Figure 9A:
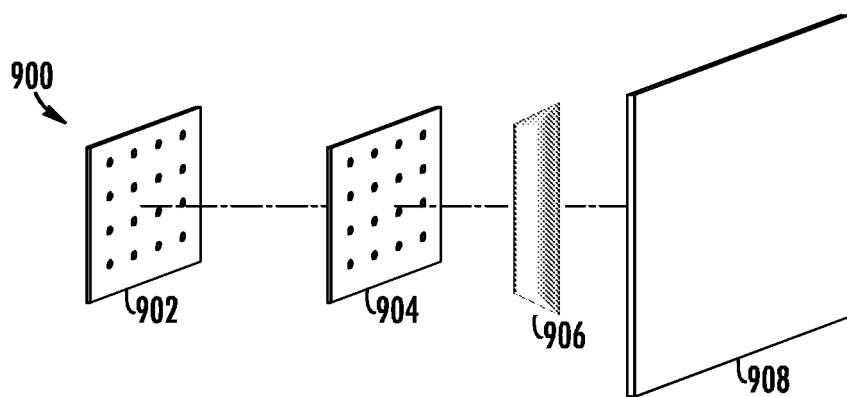
FIG. 9A depicts an example apparatus for non-repeating full field projection according to an example embodiment.

FIG. 9A shows an example apparatus for non-repeating full field projection. The non-repeating full field projection depicted may, for example, include a random pattern for where the random pattern is not repeated across the projection field. In some embodiments, a single piece optical component, for example single piece optical component 700 depicted in FIG. 7 includes one or more apparatuses, or components thereof, for non-repeating full field projection. For example, the apparatus and/or components thereof may be included such that the first, left light pattern and/or second, right light pattern each comprise a non-repeating full field pattern. It should be appreciated that, in other embodiments, the mobile device comprises a dual-projector dual-pattern projection apparatus that is affixed, mounted, fastened, or otherwise secured to the device frame 802. In this regard, the dual-projector dual-pattern projection apparatus may include two projector devices, each configured for projecting a full-field pattern of a particular dual-pattern. In such embodiments, the two projector devices may be configured to project the same pattern, or different patterns, as described herein.

The example non-repeating full-field apparatus 900 comprises a light generation source 902. The light generation source 902 may be configured to produce a light, such as a light beam, for projection to and receiving by the full field modulation mask 904 for modulation. In some embodiments, the light generation source 902 comprises a laser diode array, a VCSEL array, and/or one or more intensity light source(s), or a combination thereof. In some embodiments, the light generation source 902 comprises only a single high intensity light generation source, laser, or the like. In some embodiments, a coherent light generation source is utilized, while in other embodiments a non-coherent light generation source may be utilized.

The example apparatus 900 further comprises a non-repeating full field modulation mask 904. The non-repeating full field modulation mask 904 may be utilized to provide a random pattern for projection. In some embodiments, the random pattern is fully random, semi-random, or pseudo-random. For example, non-repeating full field modulation mask 904 may receive the light provided by light generation source 902 and modulate the received light to produce a random pattern associated with the non-repeating full field modulation mask. The non-repeating full field modulation mask 904, in some examples, comprises a single mask without duplication optics, a lenslet array, or the like. For example, the non-repeating full field modulation mask 904, in some embodiments, is manufactured and/or otherwise constructed to define the particular random pattern. Full-field modulation mask 904 may improve the complexity and accuracy of image processing associated with detecting, separating, and/or analyzing the resulting pattern. Particularly, the non-repeating nature of the non-repeating full field modulation mask may eliminate potential mismatch caused by tile and/or sub-pattern repetition, and further may improve computing resources management by reducing or eliminating the need to allocate computing resources for such error detection and error handling. Apparatuses, systems, devices and the like comprising the non-repeating full field modulation mask 904 may have improved stability and, additionally or alternatively, may be made at a lower cost.

The non-repeating full field modulation mask 904 may produce the random pattern, and be orientated such that projection optics 906 receives the random pattern for projecting the random pattern. In some embodiments, projection optics 906 comprises at least one optical component for projecting the random pattern onto an object. Additionally or alternatively, in some embodiments the projection optics 906 further comprises one or more additional optics components. For example, in some embodiments, the projection optics 906 further comprises a field correction optics element for correcting one or more field errors. Additionally or alternative, for example, the optical projection 908 additionally or alternatively comprises a uniform intensity distribution component. The uniform intensity distribution component may be configured to distribute the light such that the projected light intensity associated with the pattern is distributed above a uniformity threshold along the area of the pattern.

Various implementations may be used to implement the uniform intensity distribution component. In some embodiments, for example, the uniform intensity distribution component may be implemented as a customized aperture with a shape matching the lens assembly that introduces a controlled vignetting of the incoming light. In this regard, the customized aperture may compensate for the non-uniformity of the light distribution, and thus decrease the risk that the non-uniform light distribution causes errors in capturing and analyzing the projected patterns. In other embodiments, for example, the uniform intensity distribution component may comprise a light attenuator that compensates for the non-uniformity of the light distribution. For example, the light attenuator may comprise a greyscale attenuator mask located between the light generation source 902 and the non-repeating full field modulation mask 904. The greyscale distribution of the light attenuator may be specially designed to compensate for the non-uniformity of the incoming light, and thus decrease the risk that the non-uniform light distribution causes errors in capturing and analyzing the projected patterns.

In some embodiments, the projection optics 906 produces the random pattern, for example, for projection to a projection field 908. The random pattern may represent a particular non-repeating full field pattern associated with the non-repeating full field modulation mask 904. In this regard, the non-repeating full field pattern may be designed such that each captured area of the non-repeating full field modulation mask is designed to be unique at and/or above a particular capture size or window size. The unique pattern improves matching of the captured area to the corresponding location in the non-repeating full field pattern. In other words, in some embodiments, the non-repeating full field pattern may embody a unique pattern across the full projection field and not repeat a particular section or pattern snippet throughout the entirety of the full projection field. In this regard, the placement of the features in the pattern may be unique, such that snippets of the pattern are not repeated throughout the remainder of the full projection field.

It should be appreciated that, in at least some embodiments, the non-repeating full field modulation mask 904 comprises a single mask associated with producing a random pattern for non-repeating full field projection. In this regard, the non-repeating full field modulation mask 904 produces the random pattern without duplication optics, for example without duplication optical elements and/or a lenslet array. In some embodiments, the non-repeating full field modulation mask 904, in conjunction with the projection lens, provides the random pattern across the entirety of the projection field 908.

In other embodiments, one or more of the apparatus 900 may be used for dual-pattern projection over a full field. For example, in some embodiments, a dual-pattern projection apparatus may comprise two identical projectors, each embodied by the apparatus 900, configured to project the two patterns into the full projection field to form a dual-pattern. Similarly, in some embodiments, a dual-pattern projection apparatus may comprise two projectors, with the second projector configured to project a second pattern with features at a different orientation from the first pattern (e.g., rotated 90 degrees). In other embodiments, a dual-pattern projection apparatus may comprise the apparatus 900 and a corresponding beam splitter for generating the dual patterns.

Figure 9B:
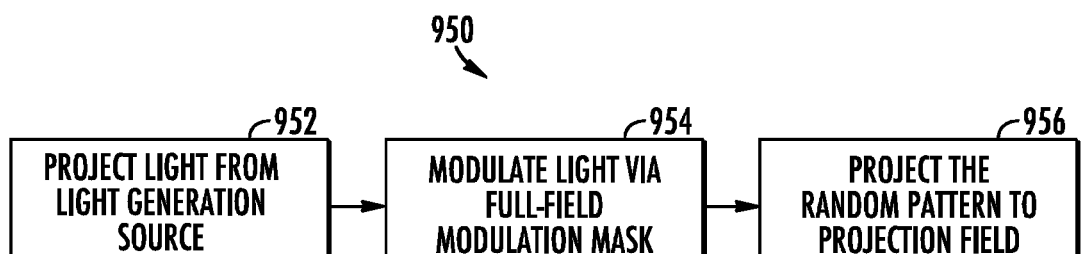
FIG. 9B depicts an example method for non-repeating full field projection according to an example embodiment.

FIG. 9B shows a method 950 for non-repeating full field projection, in accordance with an example embodiment. The method 950 may be performed by one or more of a myriad of systems, for example those depicted with respect to FIG. 1, 2, 3, 7, or 9. In some embodiments, for example, the operations of the method are performed by a non-repeating full field projection apparatus, such as apparatus 900. In other embodiments, the operations of the method are performed via a projection apparatus, such as apparatus 700, for projecting a left pattern and/or a right pattern.

At 952, light is projected from a light generation source. In some embodiments, the light is one or more lasers generated by an edge emitting diode laser, VSCEL, VSCEL array, or other high-intensity coherent or non-coherent light generation source. In some embodiments, the light is projected in response to a hardware and/or software signal indicating initiation of projection.

At 954, the light is modulated via a non-repeating full field modulation mask. In some embodiments, the non-repeating full field modulation mask embodies a single mask associated with a particular random pattern. The random pattern, in some embodiments, may include randomly distributed features such that any portion is not repeated throughout the remainder of the full projection field, such that each portion of the random pattern may be uniquely identifiable throughout the full projection field. In some embodiments, the non-repeating full field modulation mask is orientated to receive the light produced by the light generation source.

The random pattern produced via the non-repeating full field modulation mask may be a non-repeating full field random pattern projected to the entirety of the full projection field. In this regard, the random pattern does not include sub-patterns, segments, or portions that are repeated throughout the full projection field. Further, in this regard, each portion of the non-repeating full field random pattern may be unique from the remainder of the non-repeating full field random pattern. A captured portion of the pattern, for example captured by an imager, camera, or other image capture device, is thus identifiable with certainty as to where the captured portion is located within the non-repeating full field random pattern. Advantageously, such embodiments eliminate confusion over conventional arrangements, patterns, systems, or the like, where the pattern(s) includes repeated instances of a particular sub-pattern (e.g., M repetitions along a length axis and N repetitions along a width axis). Eliminating such errors improves the rate at which a dimensioning apparatus may function by improving the efficiency and accuracy of localizing a captured portion of the projected pattern, further improving the efficiency and accuracy of a dimensioning system, device, or apparatus overall.

At 956, the random pattern is projected to the projection field. In some embodiments, the random pattern produced by the non-repeating full field modulation mask is projected via a projection optics. The projection optics, in some embodiments, may include one or more lenses for projecting the random pattern onto the full projection field. The random pattern may be projected to the projection field without use of use of duplication optics, such that the random pattern associated with the non-repeating full field modulation mask covers the projection field. In some embodiments, the random pattern may be projected onto an object, for example as a part of a 3D dimensioning process.

Figure 10A:
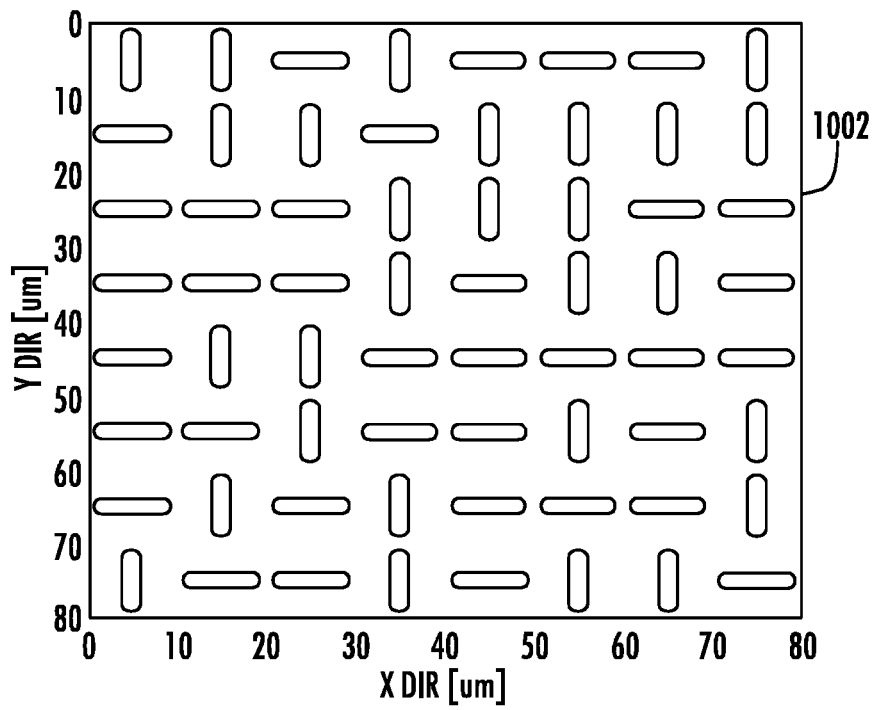
FIGS. 10A and 10B depict example patterns according to example embodiments.
Figure 10B:
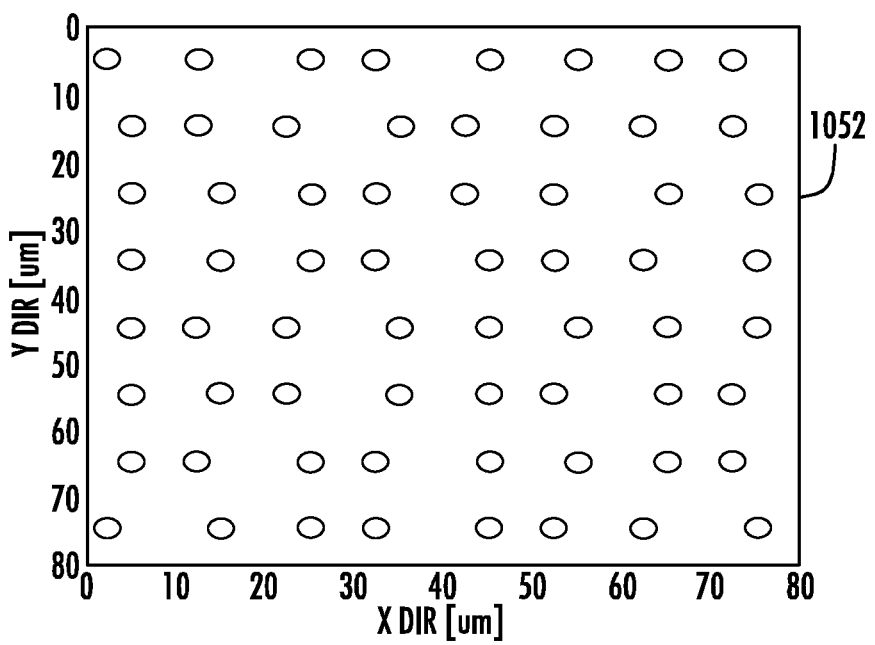

FIGS. 10A and 10B depict example patterns, in accordance with example embodiments of the present disclosure. The example patterns may each embody non-repeating full field random patterns produced via a projection apparatus, such as single-piece dual-pattern projection apparatus 700, or non-repeating full field projection apparatus 900. The provided example patterns are merely descriptive and not intended to limit the scope and spirit of the disclosure herein.

FIG. 10A depicts an example binary state non-repeating full field random pattern 1002. The binary state non-repeating full field random pattern 1002 includes features associated with two states. Specifically, the features depicted utilize orientation of each feature to represent a corresponding value (e.g., horizontal may represent 0, vertical may represent 1). For example, the features may correspond to orientations of the aperture, such as where the features are determined based on the orientation of the light generation source of the aperture. As depicted in FIG. 5, for example, the orientation of the mounted light generation source 504 may define the feature of the left pattern and/or right pattern, or may be manipulated (such as through reflecting) to create a first feature and a second feature (e.g., a mounted orientation and a rotated orientation). The features may be detectable and/or interpretable using a spectral filter and/or directional filtering algorithms, or one or more other image processing algorithms. In this regard, the pattern may be processed to determine a corresponding encoded pattern (e.g., a binary string patternized based on the features of the pattern).

The binary state non-repeating full field random pattern 1002 may cover a full projection field without duplication of any portion of the random pattern. In a particular example embodiment, for example, the binary state non-repeating full field random pattern may have a set size (e.g., 2.56 mm by 2.56 mm) that covers the entire full projection field. The binary state non-repeating full field random pattern may further be associated with a particular number of cells and cell size, for example 256 by 256 cells, each having a size of 10 micrometers by 10 micrometers. It should be appreciated that, in other embodiments, the binary state non-repeating full field random pattern 1002 may include different features and/or a different pattern of features.

FIG. 10B depicts an example multi-state (as illustrated a "tertiary state" or "3-state") non-repeating full field random pattern 1052. The multi-state non-repeating full field random pattern 1052 includes features associated with three states. Specifically, the features depicted utilize a shift amount from a center of the aperture or opening thereof to represent a corresponding value. For example, no shift (e.g., centered) may represent zero, a first directional shift (e.g., a left shift) may represent −1, and a second directional shift (e.g., a right shift) may represent 1. The features may be detectable via a position filter, for example implemented via software, hardware, or a combination thereof associated with a camera or other image capture device. Utilizing a horizontal shift, in some embodiments, the pattern may be interlaced with a second projection of the pattern while minimizing the risk over overlap between the features of first and second pattern. Thus, the particular patterns reduce the risk of failures in pattern identification and separation during processing, and improve overall efficiency and accuracy of a dimensioning system, device, apparatus, or the like.

In some embodiments, either of the non-repeating full field random patterns may be created using a second round randomization. The second round randomization may ensure the light intensity distribution is uniform, or otherwise above a threshold uniformity. In this regard, the second (and/or subsequent) randomization of the pattern may enhance the distribution of the light intensity across the full projection field, such that all portions of the pattern are sufficiently uniform.

It should be appreciated that, in other embodiments, a multi-state non-repeating full field random pattern may include features having any number of associated states. In this regard, the number of states for features is not merely associated with two or three. For example, in some embodiments, a multi-state non-repeating full field random pattern may include features having any number of states, such as four or more states. In some such embodiments, for example, feature rotation (such as aperture rotation, in the case of a physical mask, or a modulation scheme in a circumstance of software projection) may be used to differentiate features of different states, with any number of rotations being utilized to produce various features of various states. Additionally or alternatively, in some embodiments for example, feature position shift (such as feature position shift in relation to a center position) may be used to differentiate features of different states, with any number of position shifts based on a particular measurable position shift level being utilized to produce various features of various states. In some embodiments, a parameter set may be used to produce features associated with a particular state, or the parameter set may be used to produce features associated with various states.

FIGS. 11A and 11B depict tables illustrating example state numbers, names/descriptions, and various parameter sets as well as margins for each parameter set. Further, FIG. 11B illustrates example margins for detecting the random patterns illustrated and described above with respect to FIGS. 10A and 10B respectively. In this regard, each "Binary" state row is associated with a binary non-repeating full field random pattern having vertical elongated and horizontal elongated features, similar to those of binary non-repeating full field random pattern 1002, based on the parameters described in each row. Similarly, each "3-State" row is associated with a particular multi-state pattern including or embodied by a tertiary non-repeating full field random pattern having shifted features, similar to those of tertiary non-repeating full field random pattern 1052, based on the parameters described in each row.

As indicated by the table depicted in FIG. 11A, a binary non-repeating full field random pattern having the parameters of "edge" equal to 1 micrometer, "r" equal to 1 micrometer, and "el" equal to 6 micrometers is associated with a margin of 15.5%. This margin increases to 19.2% for a binary non-repeating full field random pattern having the parameters of "edge" decreased to equal 0.75 micrometer, "r" unchanged to equal 1 micrometer, and "el" increased to equal 6.5 micrometer.

Similarly, an example multi-state pattern is embodied by, or comprises, a tertiary non-repeating full field random pattern having the parameters of "edge" equal to 1 micrometer, "r" equal to 1.5 micrometer, and "shift per" equal to 2.5 micrometer is associated with a margin of 29.6%. This margin increases to 32.7% for a particular multi-state pattern comprising a tertiary non-repeating full field random pattern having the parameters of "edge" decreased to 0.75 micrometer, "r" unchanged to equal 1 micrometer, and "shift per" increased to equal 2.75 micrometer.

Each non-repeating full field random pattern may be associated with one or more parameters representing the layout of the features in the non-repeating full field random pattern. Each parameter adjusts the features and/or layout of the non-repeating full field random pattern. The parameter set may be adjusted such that margin is improved, for example at a particular desired distance. For example, in some embodiments, the length of an elongated feature may be improved to differentiate it from a circular feature, improving the margin. The length may be increased until a threshold length at which neighboring features become likely to overlap or introduce noise between the features, which makes feature identification and separation by the system less accurate. In this regard, the pattern parameters may be tuned, for example by a user, to determine such thresholds and set each parameter to an optimal value based on the threshold(s).

FIG. 11B, for example, depicts a table illustrating the margins at different non-repeating full field sizes for a binary non-repeating full field random pattern having a certain parameter set and the particular multi-state pattern comprising a tertiary non-repeating full field random pattern having a second parameter set. As illustrated, the binary non-repeating full field random pattern is associated with a 19.2% margin at a focus distance associated with a particular 3D object dimensioning apparatus or device, camera, and/or image capture module, 17.94% at 500 mm, 19.23% at 1000 mm, 20.03% at 2500 mm, and 20.27% at 4500 mm. Similarly, a tertiary non-repeating full field random pattern is associated with a 32.7% margin at a focus distance associated with the particular 3D object dimensioning apparatus or device, camera, and/or image capture module, 32.0% at 500 mm, 32.66% at 1000 mm, 33.26% at 2500 mm, and 33.47% at 4500 mm. In this regard, the margin may be optimized to improve the efficiency of pattern identification, searching, and matching while minimizing a pattern mismatch risk. For example, a higher length parameter (e.g., greater elongation of a feature) or higher shift can improve margin but excessive elongation or shift (e.g., more than a corresponding threshold) may cause a dimensioning system and/or image processing system to experience more mismatch errors of neighboring features. Similarly, a higher radius and/or higher width may improve feature identification, but excessive radius or width (e.g., more than a corresponding threshold) may similarly cause a dimensioning system and/or image processing system to experience more mismatch errors between neighboring features. Additionally, in some contexts, parameters may be tuned based on external considerations and/or regulatory constraints, such as eye safety regulatory constraints that limit the total energy associated with each feature.

Figure 12:
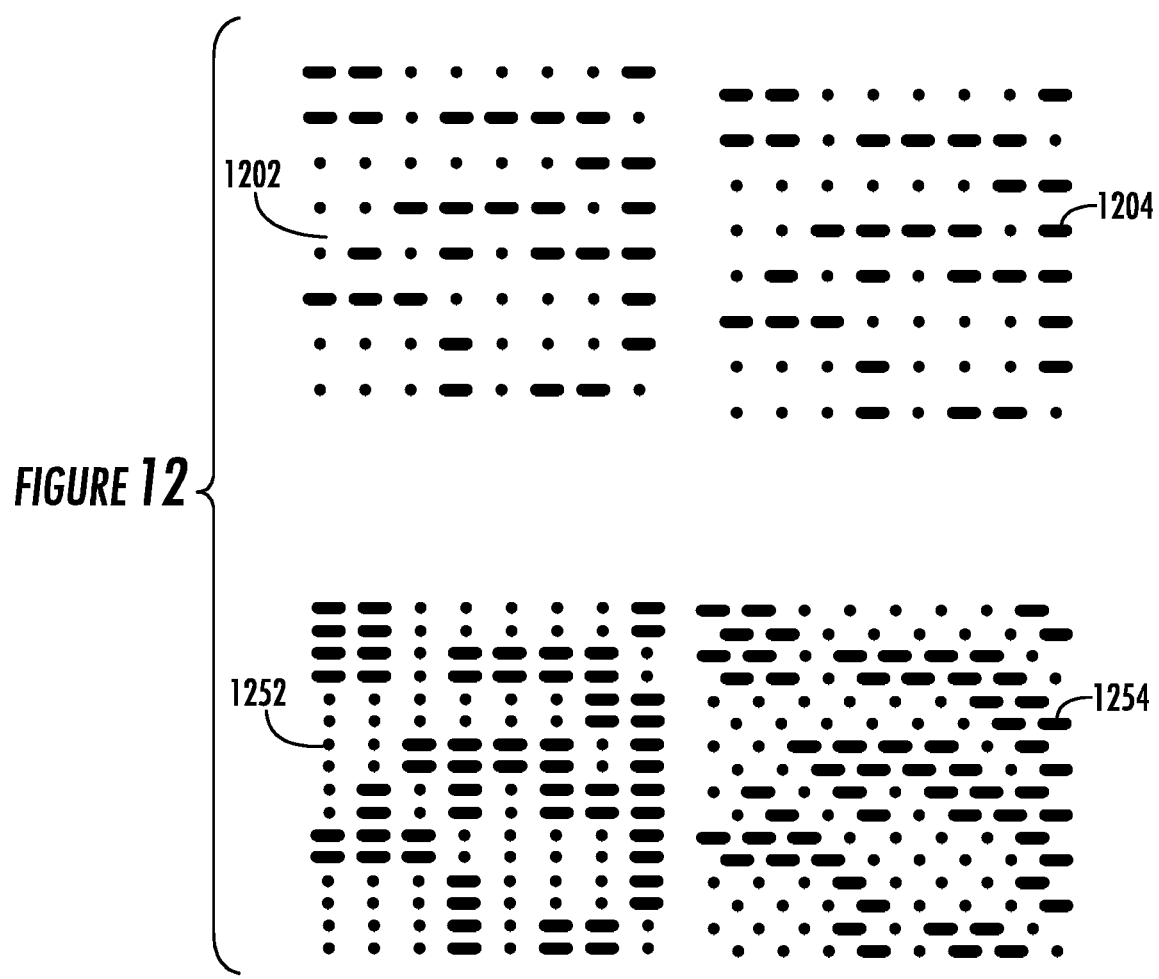
FIGS. 12 and 13 depicts example patterns and corresponding interlaced dual-patterns according to an example embodiment.

FIG. 12 illustrates an example identical patterns associated with an interlaced dual-pattern, in accordance with an example embodiment of the present disclosure. The patterns depicted may be projected to a full projection field, for example to form the interlaced dual-pattern depicted. It should be appreciated that the interlaced dual-pattern may be used for 3D object dimensioning, for example via one or more mathematical transformations based on the interlaced dual-pattern. In some embodiments, 3D object dimensioning is performed via the process described above with respect to FIG. 4 and/or utilization of Formula 1.

FIG. 12 specifically depicts a first, left pattern 1202 and a second, right pattern 1204. The left pattern 1202 and the right pattern 1204 include identical features. In the example embodiment depicted, the features comprise an elongated horizontal line and a dot, either of which may represent a 1 and the other of which may represent a zero. For example, in some embodiments, the elongated horizontal line represents 1 and the dot represents 0.

The left pattern 1202 and the right pattern 1204 may be projected to form interlaced dual-pattern 1252. The interlaced dual-pattern 1252 may be projected by a projecting apparatus, such as projecting apparatus 700 and/or non-repeating full field apparatus 900. In some embodiments, for example, the left pattern 1202 is projected via a first, left pattern generator of a projecting apparatus embodied by apparatus 700 and the right pattern 1204 is projected via a second, right pattern generator of the projecting apparatus embodied by apparatus 700. The pattern generators may enable generation of the identical first pattern 1202 and second pattern 1204 from separate projector means using a first light beam and a second light beam produced via a light splitting component, for example a beam splitter. In some embodiments, the pattern generators may receive the first light beam generated by a first projector and the second light beam generated by a second projector. In some such embodiments, the first projector may be configured together with a corresponding first pattern generator (e.g., a first, left diffractive pattern generator) and the second projector may be configured together with a corresponding second pattern generator (e.g., a second, left diffractive pattern generator) such that a light splitting component is not required.

The first, left pattern generator that produces the left pattern 1202 may be spaced a set distance (or in other embodiments, a variable distance) from the second, right pattern generator that produces the right pattern 1204. In this regard, the interlaced dual-pattern may only appear aligned at or above a threshold distance. The left pattern 1202 and the right pattern 1204 may be visibly misaligned at or closer than the threshold distance, for example resulting in the misaligned interlaced dual-pattern 1254. In some embodiments, a 3D object dimensioning apparatus, device, system, or component thereof, such as a camera, imaging assembly, or image capture device, is placed and/or operated at or above the threshold distance from the full projection field and/or an object within the full projection field to enable 3D dimensioning of an object. If misaligned interlaced dual-pattern 1254 is detected, the system may generate and/or output an error that indicates to the user and/or informs the user that the system, device, apparatus, or the like, should be moved to a threshold distance to reduce the likelihood of mismatch errors.

The patterns may form a particular encoded pattern. For example, the features may include a particular set of features corresponding to a binary string arranged via the patterns. The encoded pattern may be parsed and/or identified via the interpreted features. The encoded patterns may then be compared to determine where in the pattern the captured segment is, for example using local encoded pattern matching to find a sequence match between the left (or a first) pattern and the right (or a second) pattern. Additionally or alternatively, an apparatus, device, system, or the like may retrieve, receive, and/or otherwise identify a full encoded sequence. In at least some embodiments, the sequence may be sequential, such that identifying a particular sub-portion of the sequence enables the apparatus to efficiently identify where the sub-portion is located in the full pattern associated with the full encoded sequence. A non-repeating full-field pattern may represent an encoded pattern with a randomized sequence to improve the uniform light density distribution while maintaining the ability to correlate the left and right patterns.

The interlaced dual-pattern may provide various advantages over conventional patterns. Specifically, in some embodiments, the interlaced dual-pattern uses a particular base offset between rows of features between the first and second patterns. In some such embodiments, the first and second pattern may minimize or eliminate the risk of pattern overlap.

Figure 13:
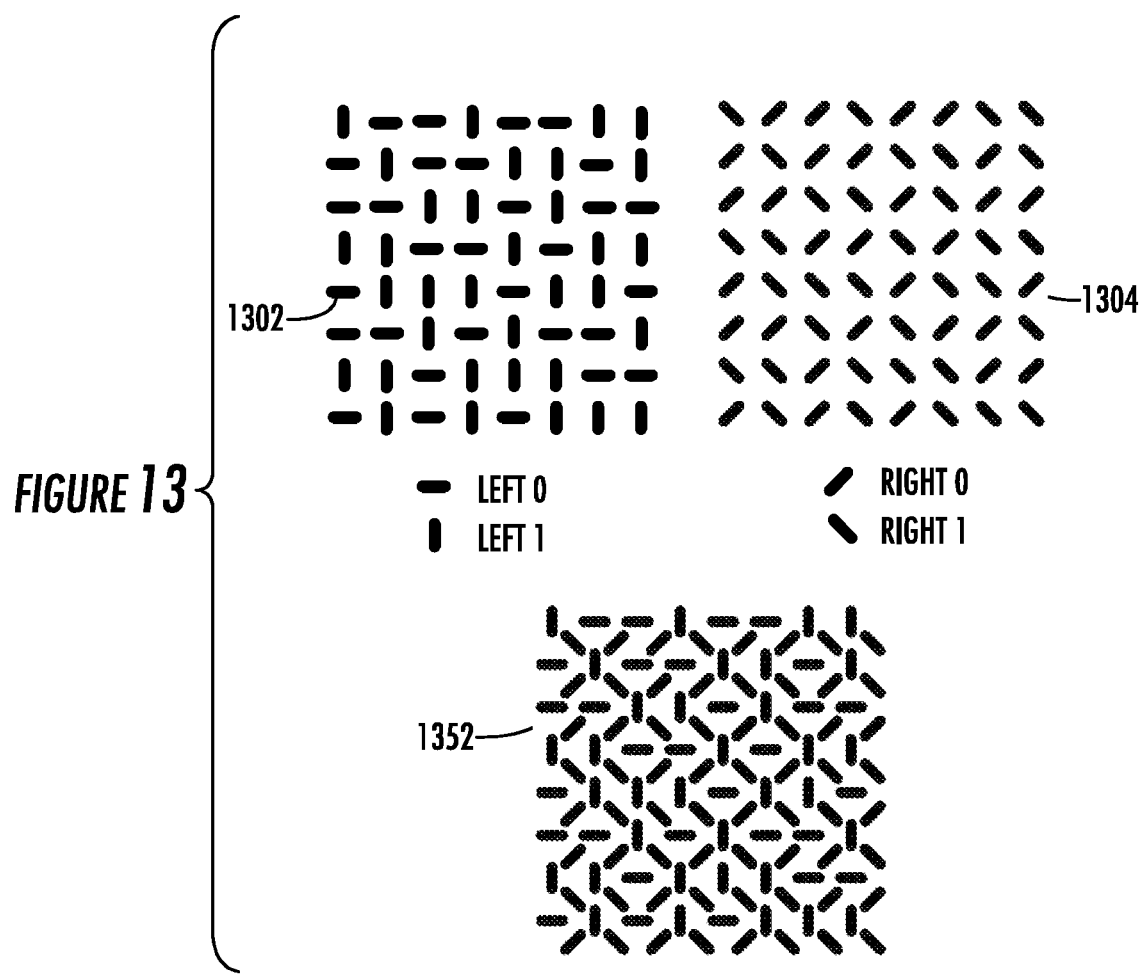

Other embodiments may produce and utilize different left, right, and/or interlaced dual-patterns. FIG. 13 illustrates other example patterns associated with another interlaced dual-pattern in accordance with an example embodiment of the present disclosure. The patterns may similarly be projected to a full projection field, for example to form the interlaced dual-pattern depicted.

The first, left pattern 1302 comprises features having horizontal elongated lines and vertical elongated lines. Specifically in the embodiment depicted, the horizontal elongated line represents a 0 and the vertical elongated line represents a 1. The second, right pattern 1304 comprises features having two elongated lines at opposite 45-degree angles from a base axis (e.g., one at a negative 45-degree angle from a base axis and the second at a positive 45-degree angle from a base axis), where the positive 45-degree elongated line represents a 1 and the negative 45-degree elongated line represents a 0, for example.

The first, left pattern 1302, for example, may be generated by a first, left pattern generator of a projection apparatus such as apparatus 700. The second, right pattern 1304 may be generated by a second, right pattern generator of the projection apparatus embodied by apparatus 700. In such embodiments, the left pattern generator and the right pattern generator may utilize different orientation pattern masks to generate the left pattern 1302 and right pattern 1304, respectively. In some embodiments, the masks and subsequently left pattern 1302 and right pattern 1304 may be associated with a baseline offset. The left pattern 1302 and the right pattern 1304 may be projected to form interlaced dual-pattern 1352 comprising the features of both the left pattern 1302 and the right pattern 1304, as well as an associated offset.

The interlaced dual-pattern 1352 may represent a full projection field. The interlaced dual-pattern 1352 may not repeat such that each portion of the interlaced dual-pattern 1352 is unique. The interlaced dual-pattern 1352 may span a particular full projection field having a particular area.

The interlaced dual-pattern 1352 may be interpreted utilizing image processing, for example by using one or more algorithms for directional filtering (for example, by applying a particular filter corresponding to the feature of the left pattern and a second filter corresponding to the feature of the right pattern) or other detection algorithms and/or decoding algorithms. For example, the interlaced dual-pattern 1352 may be interpreted by a dimensioning apparatus, camera, imaging assembly, or the like comprising and/or associated with a processor or processing circuitry and/or associated software. The left pattern 1302 may be parsed using a first directional filter set, for example a vertical filter and a horizontal filter. The right pattern 1304 may be parsed using a second directional filter set, for example using a first negative 45-degree filter and a second positive 45-degree filter. Other embodiments may utilize alternative interlaced dual-patterns and/or combined patterns, of which some may be more easily detectable and/or parsable using directional filtering or other detection algorithms than others. The filters may be used to generate a first, left encoded pattern for the left pattern and a second, right encoded pattern for the right pattern. In some embodiments, a coded pattern sequence matching algorithm may be used to match the portion of the two patterns. For example, in some embodiments, local encoded pattern matching can be directly performed between the two patterns.

Figure 14:
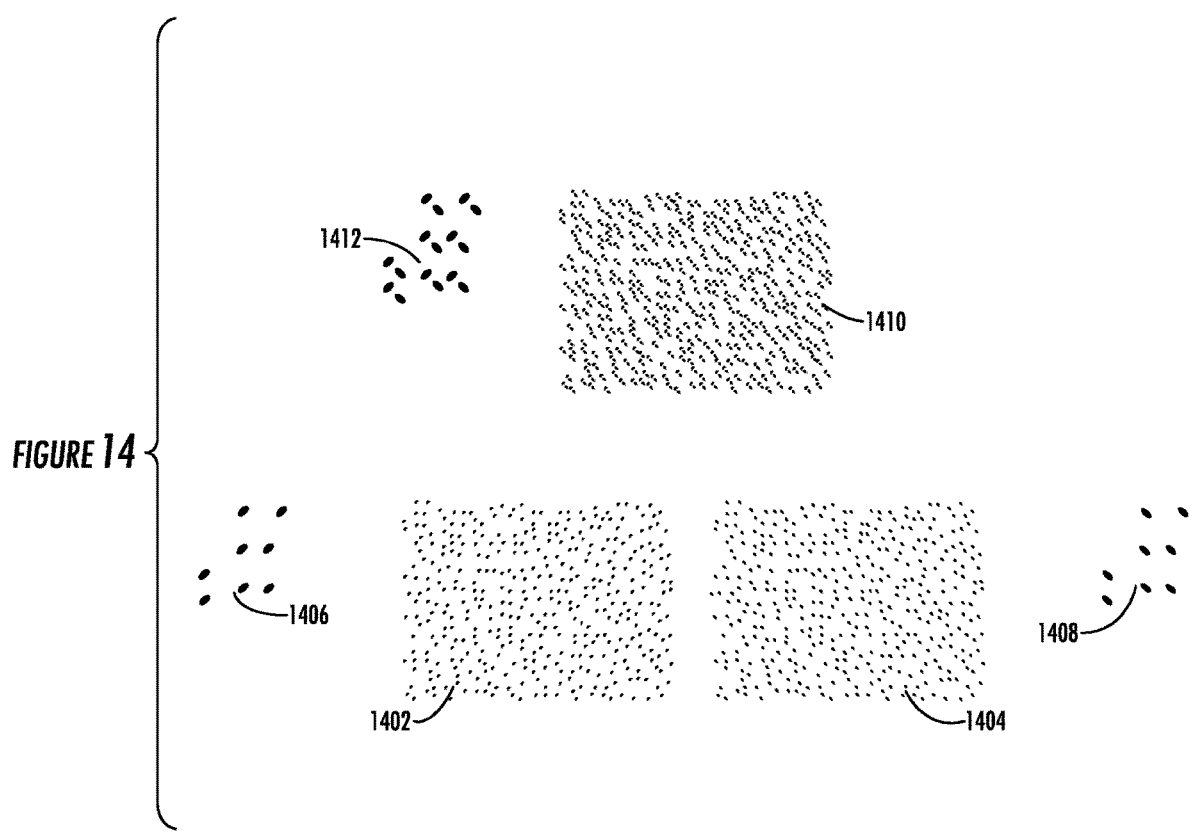
FIG. 14 depicts other example patterns and example correlated dual-pattern according to an example embodiment.

FIG. 14 illustrates example left and right patterns and a corresponding complemented dual-pattern, in accordance with an example embodiment of the present disclosure. The patterns depicted may be projected to a full projection field, for example to form the complemented dual-pattern depicted. It should be appreciated that the complemented dual-pattern may be used for 3D objection dimensioning, for example via one or more mathematical transformations based on the complemented dual-pattern. In some embodiments, 3D object dimensioning is performed via the process described above with respect to FIG. 4.

FIG. 14 specifically depicts a first, left pattern 1402 and a second, right pattern 1404. The left pattern 1402 may, for example, be produced by a first, left pattern generator. The right pattern 1404 may, for example, be produced by a second, right pattern generator. The left pattern generator may be associated with a left pattern mask and the right pattern generator may be associated with a right pattern mask, to generate the corresponding left and right patterns. In some embodiments, the left and right pattern mask may generate identical patterns comprising the different features. For example, a first light beam orientation may produce the left pattern 1402 and a second light beam orientation may produce the right pattern 1404.

The left pattern 1402 includes dot features having a first orientation, for example dot features 1406. The right pattern 1404 includes dot features having a second orientation, for example dot features 1408. The first orientation may, for example, be rotated 90 degrees from the second orientation. In this regard, the first features and the second features may be parsable and/or separable via image processing. For example, the first dot features may be associated with a first filter for use in identifying the first dot features, and the second dot features may be associated with a second filter for use in identifying the second dot features.

The left pattern 1402 and the right pattern 1404 may be projected to a full projection field. For example, the left pattern 1402 and the right pattern 1404 may be projected to form the complemented pattern 1410. The complemented pattern 1410 may represent a non-repeating full field dual-pattern projected onto a full projection field. The complemented pattern 1410 may be configured such that the complemented pattern 1410 forms a unique pattern throughout the full projection field (e.g., without repetition of a particular sub-pattern, segment or slice of the pattern, or the like).

In some embodiments, a dimensioning apparatus, camera, image capture device, and/or processing circuitry, may be configured for image processing to separate the complemented dual-pattern 1410 and identify the left pattern 1402 and the right pattern 1404. As depicted, the complemented dual-pattern comprises, or otherwise is formed from, features 1412. Features 1412 may comprise the first features 1406 and the second features 1408 based on the first pattern 1402 and the second pattern 1404. The dimensioning apparatus, camera, image capture device, and/or processing device, for example, may detect the left pattern 1402 by detecting and/or parsing the first, left features 1406 using directional filtering and/or other feature detection algorithms. Additionally or alternatively, the dimensioning apparatus, camera, image capture device and/or processing device may detect the right pattern 1404 by detecting and/or parsing the second, right features 1408 using directional filtering and/or other feature detection algorithms.

Alternatively, in other embodiments, the left filtering kernel may be associated with a larger encoding, such as:

$$
\begin{matrix}
0 & 0 & 0 & 0 & 1 \\
0 & 0 & 0 & 1 & 0 \\
0 & 0 & 1 & 0 & 0 \\
0 & 1 & 0 & 0 & 0 \\
1 & 0 & 0 & 0 & 0
\end{matrix}
$$

The encoded representation of the right filtering kernel associated with the right dot features 1408 may be rotated similarly to the rotation of the right features 1408 with respect to the left features 1406. In this regard, for example, the encoded representation may be rotated 90 degrees. For example, the right filtering kernel may be represented as:

$$
\begin{matrix}
1 & 0 & 0 \\
0 & 1 & 0 \\
0 & 0 & 1
\end{matrix}
$$

Alternatively, in other embodiments where the right filtering kernel is associated with a larger encoding, the right filtering kernel may be represented as:

$$
\begin{matrix}
1 & 0 & 0 & 0 & 0 \\
0 & 1 & 0 & 0 & 0 \\
0 & 0 & 1 & 0 & 0 \\
0 & 0 & 0 & 1 & 0 \\
0 & 0 & 0 & 0 & 1
\end{matrix}
$$

To identify the left and right patterns 1404, each filtering kernel may be applied to the complemented dual-pattern 1410 associated with a filtering threshold. The filtering threshold may be used to determine whether a particular application of the filtering kernel to a portion of the complemented dual-pattern indicates the portion of the complemented dual-pattern includes the feature corresponding to the filtering kernel. As the filtering threshold increases, the filtering kernel may satisfy the filtering threshold when more pixels match between the encoding of the portion of the pattern being analyzed and the filtering kernel. In some embodiments, each application of the filtering kernel to a captured portion may be used to determine a filtering match count for comparison to the filtering threshold. For example, the filtering match count may be calculated based on the sum of the matching activated pixels between the filtering kernel and the captured portion. For example, in some embodiments, a filtering threshold of 2 may be used to separate the complemented dual-pattern into left pattern 1402 and right pattern 1404. In a circumstance where separating the features of the left pattern from the features of the right pattern involves more precise feature distinguishing, a filtering threshold of 4 (or higher in some embodiments) may be used.

It should be appreciated that the example dot features depicted are examples and that, in other embodiments, other dot features may similarly be used. In this regard, the dot features should not be taken to limit the scope and spirit of this disclosure. Similarly, the filtering kernels described above with respect to the left dot features 1406 and right dot features 1408 are merely examples. In this regard, the alternative filtering kernels may be used. Further, the specific filtering kernels described may be enhanced, condensed, expanded, transformed, or otherwise manipulated. The specific dot feature filtering kernels disclosed should not be taken to limit the scope and spirit of this disclosure.

The complemented dual-pattern may provide various advantages over conventional patterns. Specifically, in some embodiments, the complemented dual-pattern includes specific pattern dot features for the first pattern and second dot features for the second pattern. The features may be readily identified and separated to form the two separate patterns. In some such embodiments, the first and second patterns improve the efficiency of pattern identification and pattern separation.

Figure 15:
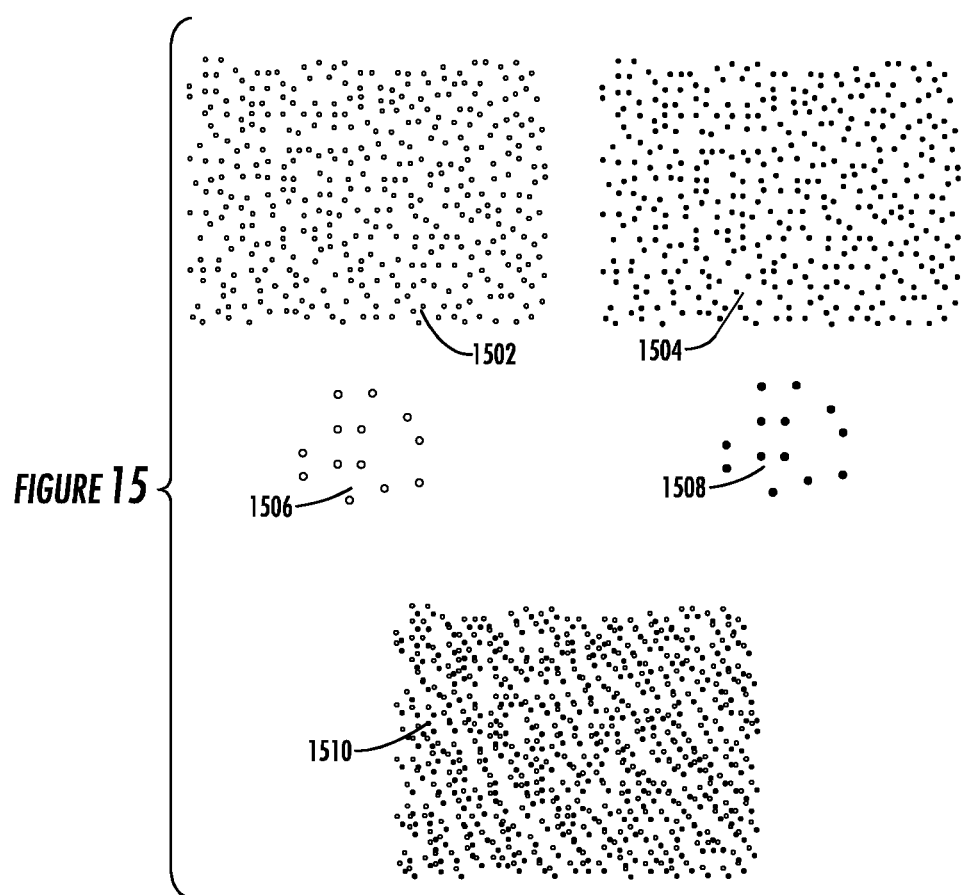
FIG. 15 depicts other example patterns and example correlated dual-pattern according to an example embodiment.

Other embodiments may produce a different left pattern, right pattern, or complemented pattern. FIG. 15 illustrates other example left and right patterns associated with another complemented dual-pattern in accordance with an example embodiment of the present disclosure. The patterns may similarly be projected to a full projection field, for example to form the complemented dual-pattern depicted.

The left pattern 1502 comprises the first features 1506. Specifically, the first features comprise, or are otherwise represented by, the feature type of open circles. The right pattern 1504 comprises the second features 1508. Specifically, the second feature 1508 comprise, or are otherwise represented by, the feature type of closed circles. Each of the left feature 1506 and the right feature 1508 may be detectable and/or parsable using one or more image processing, detection, or similar algorithms. It should be appreciated that in other embodiments, alternative feature that are detectable and/or parsable may be utilized.

The complemented pattern 1510 comprises the first, left pattern 1502 and the second, right pattern 1504. The left pattern 1502 and the right pattern 1504 may be offset by a predefined base offset. In some embodiments, the complemented pattern 1510 may be produced, for example via a first, left pattern generator and a second, right pattern generator of an example projection apparatus, for example embodied by apparatus 700, onto a full projection field.

Figure 16:
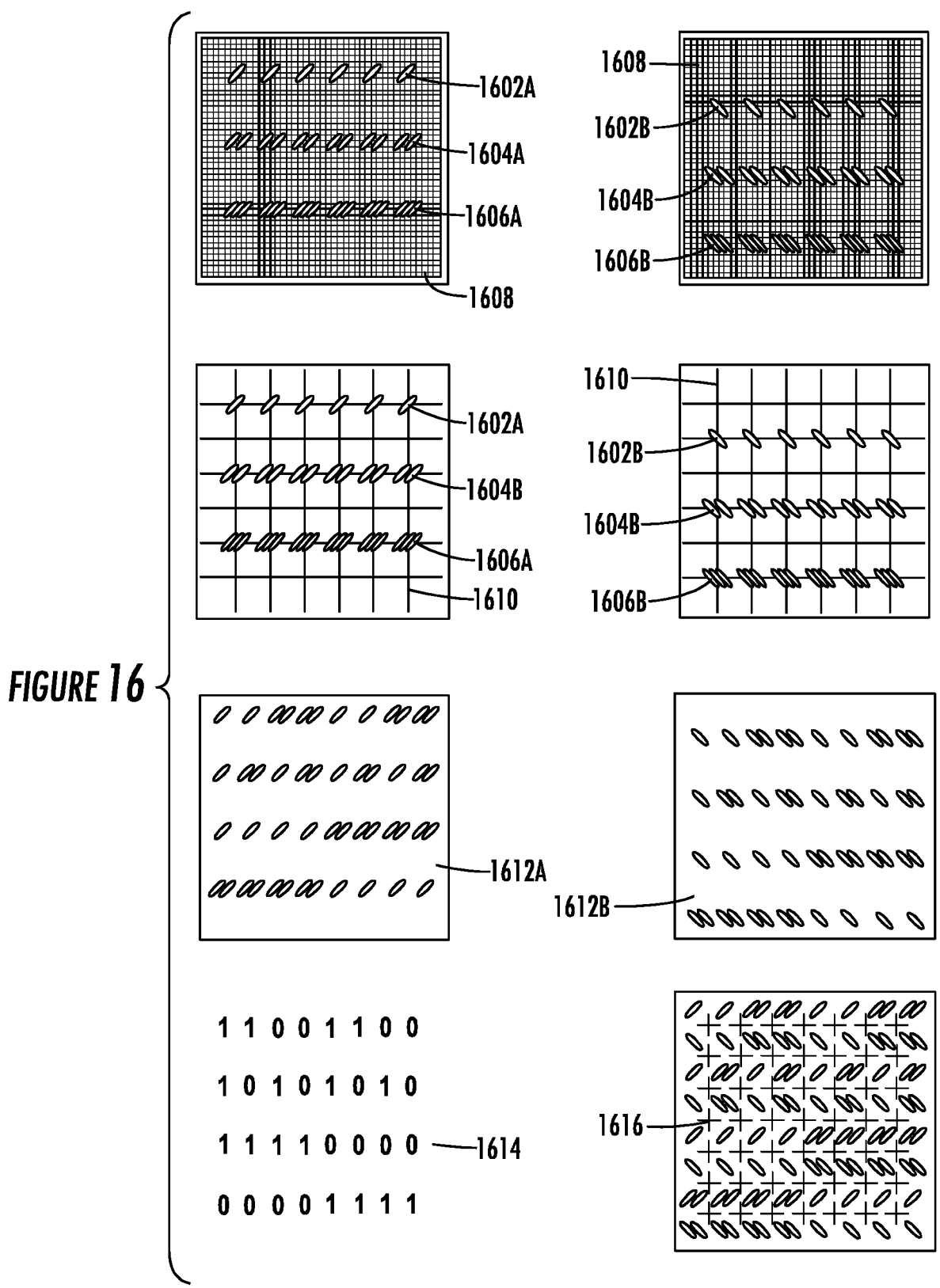
FIGS. 16 and 17 depict other example patterns and an example interlaced dual-pattern associated with a pattern grid, according to example embodiments.

FIG. 16 illustrates a first pattern and second pattern orientated associated with a pattern pitch. The first pattern and second pattern form an interlaced dual-pattern associated with a pattern pitch. The pattern pitch may define a grid of depth points for orientating the first pattern and the second pattern to form the interlaced dual-pattern.

Specifically, as depicted with respect to FIG. 16, the first, left pattern 1612A may be associated with a 3-state non-repeating full field pattern. The left pattern 1612A comprises various features representing various values. For example, the left pattern 1612A comprises single elliptical feature 1602A, double elliptical feature 1604A, and triple elliptical feature 1606A. Each of the features may represent a particular value, for example single elliptical feature 1602A may represent 1, double elliptical feature 1604A may represent 0, and triple elliptical feature 1606A may represent −1.

The second, right pattern 1612B may similarly be associated with a 3-state non-repeating full field pattern. The right pattern 1612B comprises various features representing various values. For example, the right pattern 1612B comprises a second single elliptical feature 1602B, second double elliptical feature 1604B, a second triple elliptical feature 1606B. These features may correspond to transformed versions of the features 1602A-1606A. For example, the features associated with left pattern 1612A may be rotated 90 degrees from the features associated with right pattern 1612B. Each of the features may be detectable and/or parsable using one or more image processing, detection, and/or parsing algorithms. For example, each of the features 1602A-1606A and 1602B-1606B may be detectable utilizing one or more directional filtering algorithms.

Each pattern may be associated with a sensor pixel grid, for example the sensor pixel grid 1608. Similarly, each pattern may be associated with a pattern pitch 1610. Each feature may be aligned based on the pattern pitch 1610. Each feature covers a minimum area of sensor pixels from the sensor pixel grid 1608, for example associated with a particular camera, image capture apparatus, or the like, which may be used for image capture and/or detection.

The left pattern 1612A, for example, may include a particular pattern arrangement of features as depicted. The features correspond to the binary pattern representation 1614. The right patter 1612B may similarly correspond to the binary pattern representation 1614. The binary pattern representation 1614 may be used to detect, parse, and/or decode the left pattern 1612A and/or the right pattern 1612B.

Left pattern 1612A and right pattern 1612B may be orientated and projected to match the pattern pitch 1610, for example to form interlaced dual-pattern 1616. In this regard, the location of each feature of the left pattern 1612A and the right pattern 1612B falls on a defined point associated with the pattern pitch 1610. Interlaced dual-pattern 1616 is associated with a plurality of depth points defined between the features of the interlaced dual-pattern 1616. The depth points may be utilized to calculate depth data associated with an object for 3D object dimensioning.

Figure 17:
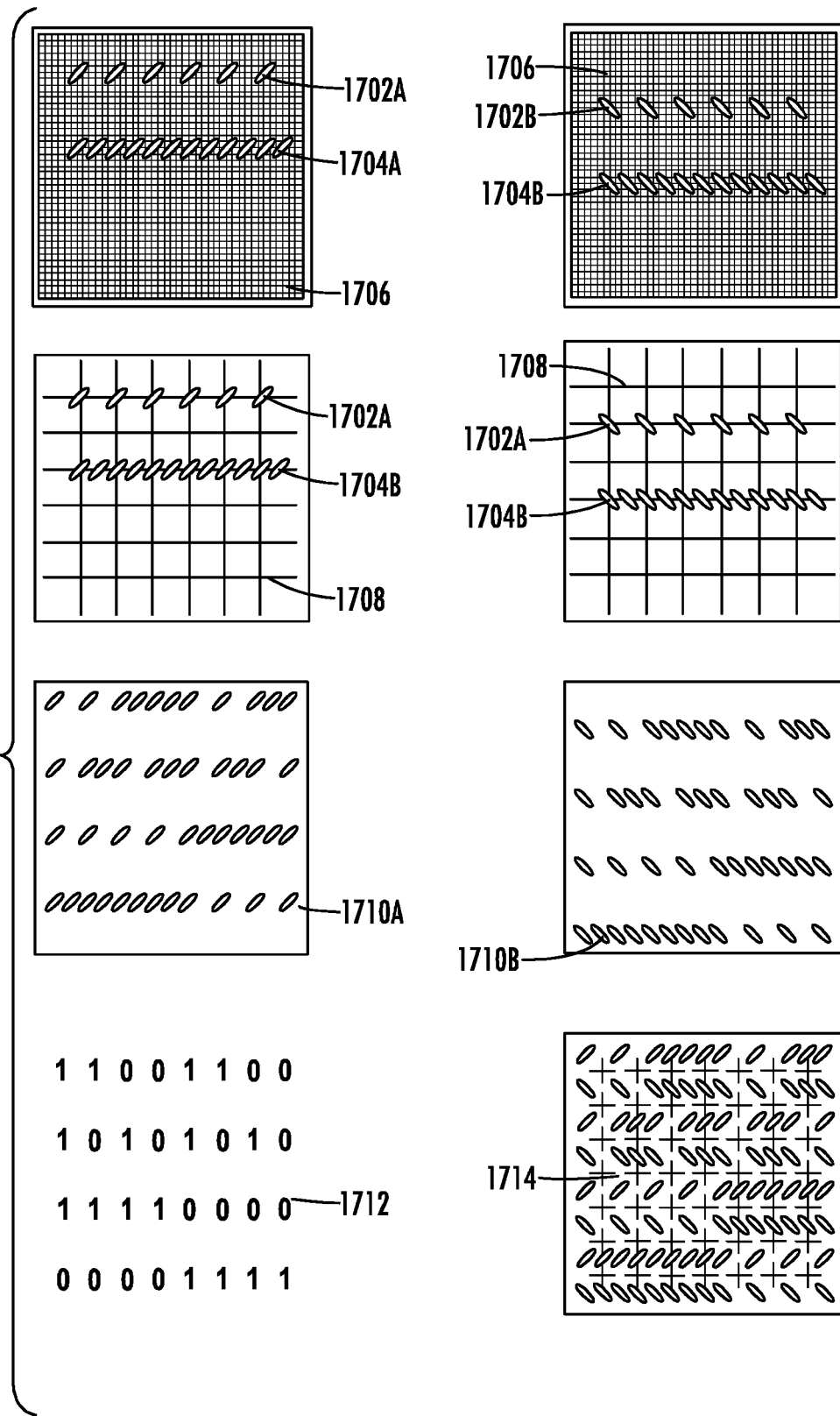

In other embodiments, one or more patterns may utilize an off-pitch pattern. As depicted with respect to FIG. 17, an interlaced dual-pattern may embody an off-pitch pattern associated with a first, left pattern and a second, right pattern.

For example, the first, left pattern 1710A, the second, right pattern 1710B, and the interlaced off-pitch dual-pattern 1714 are associated with a particular pattern pitch 1708. The pattern pitch 1708 enables orientation of the left pattern 1710A and the right pattern 1710B. The pattern pitch may similarly be associated with the sensor pixel grid 1706. Each feature placement orientated to match, such as by aligning with, the pattern pitch 1708 covers a particular portion of the sensor pixel grid 1706.

The left pattern 1710A and right pattern 1710B may embody binary non-repeating full field patterns, such that the features associated with each pattern only have two possible states, for example. As depicted, left pattern 1710A may comprise single elliptical feature 1702A and double elliptical feature 1704A. Similarly, right pattern 1710A may comprise the second elliptical feature 1702B and second double elliptical feature 1704B.

The features may, in some patterns, be orientated off of the pattern pitch based on a particular off-pitch offset. For example, the off-pitch offset may represent half the length and/or height of a particular element of the pattern pitch, such that a feature may fall halfway between two grid elements of a pattern pitch. In such embodiments, the mid-grid feature orientating may be utilized to create more depth data points. For example, each an elliptical of a double elliptical feature 604A or 604B may be used in determining the displacement with respect to a neighboring feature. For example, both ellipticals of a double elliptical feature may be used to determine a displacement between both ellipticals of a neighboring double elliptical feature.

For example, the left pattern 1710A and the right pattern 1710B may each be associated with the binary pattern representation 1712. The binary pattern representation 1712 may be utilized to detect, parse, decode, and/or otherwise process the patterns, such as when the patterns are produced and orientated to form interlaced dual-pattern 1714. The interlaced dual-pattern 1714 may utilize mid-grid feature orientating to create additional depth points for use in 3D object dimensioning.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A computer-implemented method of analyzing a dual-pattern, the computer-implemented method comprising:
    projecting a full-field dual-pattern to a full projection field using a single optical element, the full-field dual-pattern comprising a full-field left pattern and a full-field right pattern associated with a baseline offset, wherein the single optical element comprises:
        a light splitter that produces a first light beam and a second light beam from a source light beam,
        a first beam bender that relays the first light beam utilized to generate the full-field left pattern, and
        a second beam bender that relays the second light beam utilized to generate the full-field right pattern,
    wherein the single optical element causes simultaneous projection of the full-field right pattern and the full-field left pattern, and wherein the full-field right pattern and the full-field left pattern are generated without using a mask;
    detecting the full-field left pattern using a first directional filter;
    detecting the full-field right pattern using a second directional filter; and
    dimensioning an object included in the full projection field based on the detected full-field left pattern, the detected full-field right pattern, and the baseline offset.

2. The computer-implemented method of claim 1, wherein the full-field left pattern comprises left features associated with a left feature type and the full-field right pattern comprises right features associated with a right feature type,
    wherein the first directional filter matches the left feature type, and
    wherein the second directional filter matches the right feature type.

3. The computer-implemented method of claim 1, wherein dimensioning the object comprises:
    identifying a portion of the full-field left pattern;
    identifying a portion of the full-field right pattern matching the portion of the full-field left pattern;
    determining a dimensioning offset between features of the portion of the full-field left pattern and features of the portion of the full-field right pattern; and
    calculating at least one dimension parameter based on the dimensioning offset and the baseline offset.

4. The computer-implemented method of claim 3, wherein identifying the portion of the full-field right pattern matching the features of the portion of the full-field left pattern comprises:
    determining an left encoded pattern for the portion of the full-field left pattern; and
    detecting, using a local area coded feature matching algorithm, the portion of the full-field right pattern representing a right encoded pattern, wherein the left encoded pattern matches the right encoded pattern.

5. The computer-implemented method of claim 1, wherein the baseline offset is associated with a fixed pitch grid.

6. The computer-implemented method of claim 1, wherein dimensioning the object comprises:
    detecting a left local area pattern portion and a right local area pattern portion using a local area pattern correlation algorithm, wherein a left feature set of the left local area pattern portion corresponds to a right feature set of the right local area pattern portion;
    determining a dimensioning offset between the left feature set of the left local area pattern portion and the right feature set of the right local area pattern portion; and
    calculating at least one dimension parameter based on the dimensioning offset and the baseline offset.

7. The computer-implemented method of claim 1, wherein the full-field right pattern is projected from a first position and the full-field left pattern is projected from a second position, the first position different from the second position to separate the full-field right pattern and the full-field left pattern by the baseline offset.

8. The computer-implemented method according to claim 1, wherein the single optical element further comprises a light collimator that produces the source light beam from an incoming light source, wherein the source light beam represents a first feature utilized to produce the full-field left pattern and the full-field right pattern.

9. The computer-implemented method according to claim 1, wherein the first beam bender relays the first light beam to a first projection optical component of the single optical element that produces the full-field left pattern and wherein the second beam bender relays the second light beam to a second projection optical component of the single optical element that produces the full-field right pattern, wherein the first projection optical component and the second projection optical component are separated along an axis by the first beam bender and the second beam bender to define the baseline offset.

10. An apparatus for analyzing a dual-pattern, the apparatus comprising at least one processor and at least one memory, the at least one memory having computer-coded instructions therein, the computer-coded instructions, in execution with the at least one processor, configure the apparatus to:
project a full-field dual-pattern to a full projection field using a single optical element, the full-field dual-pattern comprising a full-field left pattern and a full-field right pattern associated with a baseline offset, wherein the single optical element comprises:
a light splitter that produces a first light beam and a second light beam from a source light beam,
a first beam bender that relays the first light beam utilized to generate the full-field light pattern, and
a second beam bender that relays the second light beam utilized to generate the full-field right pattern,
wherein the single optical element causes simultaneous projection of the full-field right pattern and the full-field left pattern, and wherein the full-field right pattern and the full-field left pattern are generated without using a mask;
detect the full-field left pattern using a first directional filter;
detect the full-field right pattern using a second directional filter; and
dimension an object included in the full projection field based on the detected full-field left pattern, the detected full-field right pattern, and the baseline offset.

11. The apparatus of claim 10, wherein the full-field left pattern comprises left features associated with a left feature type and the full-field right pattern comprises right features associated with a right feature type,
wherein the first directional filter matches the left feature type, and
wherein the second directional filter matches the right feature type.

12. The apparatus of claim 10, wherein to dimension the object, the apparatus is configured to:
identify a portion of the full-field left pattern;
identify a portion of the full-field right pattern matching the portion of the full-field left pattern;
determine a dimensioning offset between features of the portion of the full-field left pattern and features of the portion of the full-field right pattern; and
calculate at least one dimensioning parameter based on the dimensioning offset and the baseline offset.

13. The apparatus of claim 12, wherein to identify the portion of the full-field right pattern matching the features of the portion of the full-field left pattern, the apparatus is configured to:
determine an left encoded pattern for the portion of the full-field left pattern; and
detect, using a local area coded feature matching algorithm, the portion of the full-field right pattern representing a right encoded pattern, wherein the left encoded pattern matches the right encoded pattern.

14. The apparatus of claim 10, wherein the baseline offset is associated with a fixed pitch grid.

15. The apparatus of claim 10, wherein to dimension the object, the apparatus is configured to:
detect a left local area pattern portion and a right local area pattern portion using a local area pattern correlation algorithm, wherein a left feature set of the left local area pattern portion corresponds to a right feature set of the right local area pattern portion;
determine a dimensioning offset between the left feature set of the left local area pattern portion and the right feature set of the right local area pattern portion; and
calculate at least one dimension parameter based on the dimensioning offset and the baseline offset.

16. A computer program product for analyzing a dual-pattern, the computer program product comprising at least one non-transitory computer-readable storage medium having computer program instructions thereon, the computer program instructions, when in execution with a processor, configured to:
project a full-field dual-pattern to a full projection field using a single optical element, the full-field dual-pattern comprising a full-field left pattern and a full-field right pattern associated with a baseline offset, wherein the single optical element comprises:
a light splitter that produces a first light beam and a second light beam from a source light beam,
a first beam bender that relays the first light beam utilized to generate the full-field left pattern, and
a second beam bender that relays the second light beam utilized to generate the full-field right pattern,
wherein the single optical element causes simultaneous projection of the full-field right pattern and the full-field left pattern, and wherein the full-field right pattern and the full-field left pattern are generated without using a mask;
detect the full-field left pattern using a first directional filter;
detect the full-field right pattern using a second directional filter; and
dimension an object included in the full projection field based on the detected full-field left pattern, the detected full-field right pattern, and the baseline offset.

17. The computer program product of claim 16, wherein the full-field left pattern comprises left features associated with a left feature type and the right pattern comprises right features associated with a right feature type,
wherein the first directional filter matches the left feature type, and
wherein the second directional filter matches the right feature type.

18. The computer program product of claim 16, wherein to dimension the object, the computer program product is configured to:
identify a portion of the full-field left pattern;
identify a portion of the full-field right pattern matching the portion of the full-field left pattern;
determine a dimensioning offset between features of the portion of the full-field left pattern and features of the portion of the full-field right pattern; and
calculate at least one dimensioning parameter based on the dimensioning offset and the baseline offset.

19. The computer program product of claim 18, wherein to identify the portion of the full-field right pattern matching the features of the portion of the full-field left pattern, the computer program product is configured to:
determine an left encoded pattern for the portion of the full-field left pattern; and
detect, using a local area coded feature matching algorithm, the portion of the full-field right pattern representing a right encoded pattern, wherein the left encoded pattern matches the right encoded pattern.

20. The computer program product of claim 16, wherein to dimension the object, the computer program product is configured to:
- detect a left local area pattern portion and a right local area pattern portion using a local area pattern correlation algorithm, wherein a left feature set of the left local area pattern portion corresponds to a right feature set of the right local area pattern portion;
- determine a dimensioning offset between the left feature set of the left local area pattern portion and the right feature set of the right local area pattern portion; and
- calculate at least one dimensioning parameter based on the dimensioning offset and the baseline offset.

\* \* \* \* \*